United States Patent
Anchan et al.

(10) Patent No.: US 10,499,278 B2
(45) Date of Patent: Dec. 3, 2019

(54) HEADER COMPRESSION FOR REDUCED BANDWIDTH WIRELESS DEVICES

(71) Applicant: QUALCOMM Incorporated, San Diego, CA (US)

(72) Inventors: Kirankumar Bhoja Anchan, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 15/680,060

(22) Filed: Aug. 17, 2017

(65) Prior Publication Data

US 2018/0063746 A1 Mar. 1, 2018

Related U.S. Application Data

(60) Provisional application No. 62/382,091, filed on Aug. 31, 2016.

(51) Int. Cl.
*H04W 28/06* (2009.01)
*H04W 36/08* (2009.01)
(Continued)

(52) U.S. Cl.
CPC ........ *H04W 28/06* (2013.01); *H04W 36/0011* (2013.01); *H04W 36/08* (2013.01);
(Continued)

(58) Field of Classification Search
CPC . H04W 28/06; H04W 36/0011; H04W 36/08; H04W 84/042; H04W 80/06;
(Continued)

(56) References Cited

U.S. PATENT DOCUMENTS

| 2003/0093513 A1 | 5/2003 | Hicks et al. |
| 2013/0083702 A1* | 4/2013 | Barany ............... H04W 28/06 370/261 |

(Continued)

FOREIGN PATENT DOCUMENTS

| WO | WO-03107616 A1 | 12/2003 |
| WO | WO-2009012416 A2 | 1/2009 |
| WO | WO-2016077730 A1 | 5/2016 |

OTHER PUBLICATIONS

A. Sollaud., "G.729.1 RTP Payload Format Update: Discontinuous Transmission (DTX) Support, Request for Comment (RFC) 5459", Jan. 2009, available at http://tools.ietf.org/html/rfc5459.

(Continued)

*Primary Examiner* — Jae Y Lee
(74) *Attorney, Agent, or Firm* — Holland & Hart LLP

(57) ABSTRACT

Improved methods, systems, devices, or apparatuses support header compression for reduced bandwidth wireless devices prior to an initial transmission that includes a real-time data payload. A data flow containing real-time multimedia data may be initiated between a UE and a base station. In order to enhance the likelihood of meeting data flow timing constraints, compression context may be established prior to a first transmission of a packet with a real-time data payload. The one or more initial transmissions may include a small payload, that is smaller than typical real-time data payloads, may be used to establish compression context for the data flow. When a packet with a real-time payload is to be transmitted, the transmission may use header compression and be transmitted in less time than a transmission without header compression.

30 Claims, 19 Drawing Sheets

(51) Int. Cl.
  *H04W 36/00*   (2009.01)
  *H04L 29/06*   (2006.01)
  *H04W 80/06*   (2009.01)
  *H04W 84/04*   (2009.01)
(52) U.S. Cl.
  CPC ........... *H04L 65/608* (2013.01); *H04W 80/06* (2013.01); *H04W 84/042* (2013.01)
(58) Field of Classification Search
  CPC ....... H04L 69/04; H04L 69/24; H04L 65/607; H04L 65/608
  See application file for complete search history.

(56) References Cited

U.S. PATENT DOCUMENTS

2015/0256653 A1\* 9/2015 Ambriss ................ H04L 69/04
                                                                370/235
2017/0171817 A1\* 6/2017 Zhao .................... H04L 5/0053

OTHER PUBLICATIONS

ISA/EP, International Search Report and Written Opinion of the International Searching Authority, Int'l Application No. PCT/US2017/047588, dated Oct. 24, 2017, European Patent Office, Rijswijk, NL, 16 pgs.

\* cited by examiner

HEADER COMPRESSION FOR REDUCED BANDWIDTH WIRELESS DEVICES

CROSS REFERENCES

The present Application for Patent claims priority to U.S. Provisional Patent Application No. 62/382,091 by Anchan, et al., entitled "Header Compression For Reduced Bandwidth Wireless Devices," filed Aug. 31, 2016, assigned to the assignee hereof.

BACKGROUND

The following relates generally to wireless communication, and more specifically to data flow management for capacity-limited wireless devices.

Wireless communications systems are widely deployed to provide various types of communication content such as multimedia, voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, alarm panels, control panels, wearable devices, weather and geological event monitoring, fleet management and tracking, remote security sensing, physical access control, and transaction-based business charging, to name a few non-exhaustive examples.

Some wireless communications systems may employ coverage enhancement (CE) techniques that increase system robustness. There may be different levels of CE such that higher level CE provide more reliable communications, particularly for devices that are located relatively far away from a base station or in locations where wireless transmissions are relatively highly attenuated (e.g., in a basement location), relative to lower level CEs. In many cases, CE relies on repetition of transmissions, which may impact timelines for transmitting and processing certain types of communications.

SUMMARY

The described techniques relate to improved methods, systems, devices, or apparatuses that support header compression for reduced bandwidth wireless devices. Generally, the described techniques provide for establishment of compression schemes prior to transmission of real-time data. In some cases, a data flow (e.g., internet protocol (IP) flow) containing real-time multimedia data (e.g., voice data) may be initiated between a UE and a base station. In order to enhance the likelihood of meeting data flow timing constraints, compression context (e.g., context to provide robust header compression (RoHC) first order or second order header compression) may be established prior to the transmission of real-time data.

In some examples, one or more initial transmissions may include a small payload (e.g., smaller than typical real-time data payloads) that may be used to establish compression context for the data flow. When actual real-time data, such as multimedia data, is to be transmitted, it can be transmitted with the established compression context and therefore transmitted in a reduced time relative to an uncompressed transmission. In some examples, the compression may be established through out-of-band signaling (e.g., radio resource control (RRC) or non-access stratum (NAS) signaling). In some cases, a source base station may transfer compression information to a target base station as part of a handover of a UE from the source base station to the target base station.

A method of wireless communication is described. The method may include initiating a data flow containing real-time multimedia data between a UE and a base station and transmitting, prior to a first multimedia data transmission of the data flow between the UE and the base station, one or more initial transmissions to establish a compression scheme for the data flow.

An apparatus for wireless communication is described. The apparatus may include means for initiating a data flow containing real-time multimedia data between a UE and a base station and means for transmitting, prior to a first multimedia data transmission of the data flow between the UE and the base station, one or more initial transmissions to establish a compression scheme for the data flow.

Another apparatus for wireless communication is described. The apparatus may include a processor, memory in electronic communication with the processor, and instructions stored in the memory. The instructions may be operable to cause the processor to initiate a data flow containing real-time multimedia data between a UE and a base station and transmit, prior to a first multimedia data transmission of the data flow between the UE and the base station, one or more initial transmissions to establish a compression scheme for the data flow.

A non-transitory computer readable medium for wireless communication is described. The non-transitory computer-readable medium may include instructions operable to cause a processor to initiate a data flow containing real-time multimedia data between a UE and a base station and transmit, prior to a first multimedia data transmission of the data flow between the UE and the base station, one or more initial transmissions to establish a compression scheme for the data flow.

In some examples of the method, apparatus, and non-transitory computer-readable medium described above, the data flow may be an internet protocol (IP) flow.

In some examples of the method, apparatus, and non-transitory computer-readable medium described above, the one or more initial transmissions comprises one or more silence indicator description (SID) packet transmissions. In some examples of the method, apparatus, and non-transitory computer-readable medium described above, the one or more initial transmissions comprises one or more voice packets that include a simulated voice payload having a payload size that may be smaller than an average voice packet payload size. In some examples of the method, apparatus, and non-transitory computer-readable medium described above, the one or more initial transmissions comprises one or more silence indicator description (SID) packet transmissions, or one or more voice packets that include a simulated voice payload, or one or more real-time transport protocol (RTP) extension header extension profiles, or one or more RTP voice profiles with a defined number of codec frame bits, the one or more initial transmissions may have a payload size that may be smaller than an average voice packet payload size.

In some examples of the method, apparatus, and non-transitory computer-readable medium described above, the compression scheme may be a RoHC scheme, and establishing a RoHC context for header compression of packets in the data flow may be based at least in part on the one or more initial transmissions. Some examples of the method, apparatus, and non-transitory computer-readable medium described above may further include processes, features, means, or instructions for transmitting the first multimedia data transmission using the established RoHC context. In some examples of the method, apparatus, and non-transitory computer-readable medium described above, the established RoHC context corresponds to a first order or a second order RoHC state.

In some examples of the method, apparatus, and non-transitory computer-readable medium described above, the one or more initial transmissions comprises one or more out-of-band transmissions that establish the compression scheme for the data flow. In some examples of the method, apparatus, and non-transitory computer-readable medium described above, the one or more out-of-band transmissions comprise one or more RRC transmissions or one or more NAS messages. In some examples of the method, apparatus, and non-transitory computer-readable medium described above, the one or more out-of-band transmissions comprises a medium access control (MAC) message that includes information to establish a RoHC context for header compression of packets in the data flow. In some examples of the method, apparatus, and non-transitory computer-readable medium described above, one or more portions of header compression information for the data flow, user datagram protocol (UDP) header fields, or RTP header fields including sequence number and timestamp, for the first multimedia data transmission may be determined based at least in part on the information in the MAC message.

Some examples of the method, apparatus, and non-transitory computer-readable medium described above may further include processes, features, means, or instructions for discontinuing the one or more initial transmissions when the compression scheme corresponds to a first order compression state or a second order compression state, or based at least in part on an amount of buffered real-time multimedia data.

In some examples of the method, apparatus, and non-transitory computer-readable medium described above, the initiating comprises initiating a handover between a first base station and a second base station, and wherein the one or more initial transmissions comprise one or more initial transmissions between the UE and the second base station. In some examples of the method, apparatus, and non-transitory computer-readable medium described above, the initiating comprises performing a call set up with a far-end device to set up the data flow, and transmitting, as part of the call set up, an indication to the far-end device to establish the compression scheme prior to the first multimedia data transmission of the data flow. In some examples of the method, apparatus, and non-transitory computer-readable medium described above, the indication prompts the far-end device to transmit the one or more initial transmissions to establish a RoHC context for header compression of packets in the data flow.

Another method of wireless communication is described. The method may include identifying a data flow containing real-time multimedia data that is to be initiated with a UE and receiving, prior to a first multimedia data transmission of the data flow from the UE, one or more initial transmissions to establish a compression scheme for the data flow.

An apparatus for wireless communication is described. The apparatus may include means for identifying a data flow containing real-time multimedia data that is to be initiated with a UE and means for receiving, prior to a first multimedia data transmission of the data flow from the UE, one or more initial transmissions to establish a compression scheme for the data flow.

Another apparatus for wireless communication is described. The apparatus may include a processor, memory in electronic communication with the processor, and instructions stored in the memory. The instructions may be operable to cause the processor to identify a data flow containing real-time multimedia data that is to be initiated with a UE and receive, prior to a first multimedia data transmission of the data flow from the UE, one or more initial transmissions to establish a compression scheme for the data flow.

A non-transitory computer readable medium for wireless communication is described. The non-transitory computer-readable medium may include instructions operable to cause a processor to identify a data flow containing real-time multimedia data that is to be initiated with a UE and receive, prior to a first multimedia data transmission of the data flow from the UE, one or more initial transmissions to establish a compression scheme for the data flow.

Some examples of the method, apparatus, and non-transitory computer-readable medium described above may further include processes, features, means, or instructions for identifying the one or more initial transmissions as compression scheme establishment transmissions, and dropping the one or more initial transmissions from the data flow.

In some examples of the method, apparatus, and non-transitory computer-readable medium described above, the one or more initial transmissions comprises one or more SID packet transmissions or one or more voice packets that include a simulated voice payload having a payload size that may be smaller than an average voice packet payload size. Some examples of the method, apparatus, and non-transitory computer-readable medium described above may further include processes, features, means, or instructions for establishing a RoHC context for header compression of packets in the data flow based at least in part on the one or more initial transmissions, and receiving the first multimedia data transmission using the established RoHC context.

In some examples of the method, apparatus, and non-transitory computer-readable medium described above, the one or more initial transmissions comprises one or more out-of-band transmissions that establish the compression scheme for the data flow. In some examples of the method, apparatus, and non-transitory computer-readable medium described above, the one or more out-of-band transmissions comprise one or more RRC transmissions or one or more NAS messages.

In some examples of the method, apparatus, and non-transitory computer-readable medium described above, the one or more initial transmissions may be discontinued when the compression scheme corresponds to a first order state or a second order state, or based at least in part on an amount of buffered real-time multimedia data.

In some examples of the method, apparatus, and non-transitory computer-readable medium described above, the method may be performed at a target base station that is to communicate with the UE following a handover from a source base station, and wherein the one or more initial transmissions comprise a RoHC context for header compression of packets in the data flow that may be established at the source base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
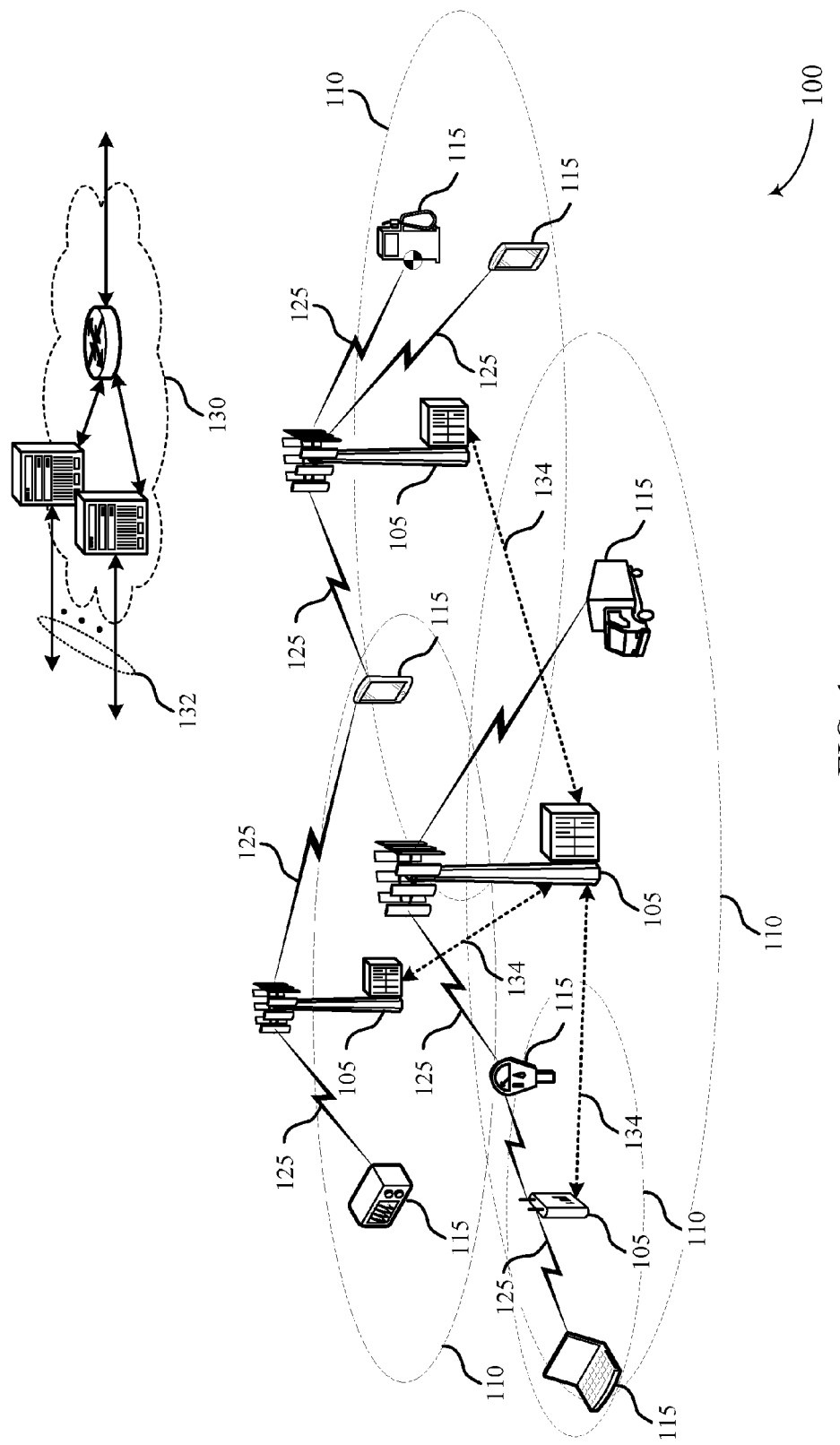
FIG. 1 illustrates an example of a system for wireless communication that supports header compression for reduced bandwidth wireless devices in accordance with aspects of the present disclosure.

Real-time communications with a wireless device may require that certain communications be completed within certain time periods, in order to prevent large gaps in the communication or a diminished user experience. For example, in a real-time multimedia communication, such as voice communications, a wireless device may generate voice packets every 20 ms, and if it consistently takes longer than an average of 20 ms to transmit the voice packets, delays may accumulate and result in a connection that may not be maintained. In deployments that use CE techniques for certain transmissions that rely on repetitions of data, consistently meeting average time constraints may be difficult. In particular, meeting timelines associated with RTP IP flows, such as voice-over-LTE (VoLTE) calls, may be difficult for such devices In some cases, for example, a bandwidth limited, power limited, coverage extension UE may initiate a VoLTE call. RoHC may be used for data transmitted in the associated data flow that may, in steady state, compress a 64 byte header to a 3 byte header, thus enabling an encapsulation and repetition schedule for RTP media of the data flow.

However the initial context set up to establish RoHC compression uses one or more transmissions that have uncompressed headers, which may add, for example, 488 bits of uncompressed header information. For a bandwidth limited, power limited, coverage extension UE that is already operating near the edge of bandwidth and time delay constraints, the overhead of an additional 488 bits of uncompressed header adds to either the time delay constraints or congestion, which may result in poor audio quality or call failures. Additionally, at a handoff from a source to a target base station, RoHC context is reset and the timeline constraint problems may be encountered at handoffs.

The described techniques relate to improved methods, systems, devices, or apparatuses that support header compression for reduced bandwidth wireless devices prior to an initial transmission that includes a real-time data payload. Generally, the described techniques provide for enhanced communications of reduced bandwidth devices, or devices with poor channel quality that operate according to one or more CE techniques, through establishment of compression schemes prior to transmission of real-time data payloads. In some cases, a data flow containing real-time multimedia data may be initiated between a UE and a base station. In order to enhance the likelihood of meeting data flow timing constraints, compression context (e.g., context to provide RoHC first order or second order compression) may be established prior to the transmission of real-time data. In some examples, one or more initial transmissions may include a small payload (e.g., is smaller than typical real-time data payloads) that may be used to establish compression context for the data flow. Such a small payload may be smaller than an average RTP payload, and in some examples may include a SID packet, a small simulated voice payload, an RTP extension header extension profile, one or more RTP voice profiles with a defined number of codec frame bits (e.g., an RTP profile with more than or as few as the lowest number of bits per frame allowed by a codec), or any combination thereof. In some examples, a codec may be used for compression and decompression of data in the data flow to speed up transmission and reception of such data. In an example, the one or more initial transmissions may be a zero bit codec frame. A zero bit codec frame type in an enhanced variable rate codec (EVRC) or a selectable mode vocoder (SMV) may be referred to as the Null frame, which may be generated when a vocoder is running at rate 0. The RTP voice profile may specify one or more parameters of a data flow. The RTP voice profile may specify, for example, a sampling rate, a code rate, the number of bits per frame, or the like, of the data flow.

When actual real-time data, such as multimedia data, is to be transmitted, it can be transmitted with the established compression context and therefore transmitted in a reduced time relative to an uncompressed transmission. In some examples, such initial transmissions may be transmitted upon initiation of the data flow. For example, at the beginning of a VoLTE call, for a few 100 s of milliseconds, often there is no true voice media for the call exchanged as a result of delayed user reaction to call connection time. This "idle" time may be exploited, in some examples, to set up RoHC context with very small RTP payload. In such examples, when a VoLTE call set up is ongoing, and the source and destination ports and IP address are available, the UE may preemptively send RTP SID frames before sending the RTP media. Depending on the implementation 2-3 such frames would be sufficient to set up the RoHC context, and may be provided during this initial idle time. Thus, when a RTP voice frame with actual voice data payload is to be delivered, the UE and base station have reached full content for RoHC and the link can handle the underlying traffic with reduced time delays.

In some examples, out-of-band communications may be used to establish the RoHC context, such as communications using RRC or NAS signaling. For example, a MAC control element may carry the initial context information between UE and base station, such as where the UE starts and increments its RTP sequence number and timestamp, which may be used to establish first order or second order RoHC context.

As indicated above, compression context may need to be established when a UE is handed over from a source base station to a target base station. In some examples, on detecting handoff, a UE can initiate either the initial small payload transmissions, or out-of-band signaling, to establish compression prior to transmission of real-time data payloads. In some examples, the source base station may transfer the compression context to the target base station to establish compression prior to transmission of real-time data payloads.

In some examples, a far-end device of the data flow may also assist with preemptive compression context set up. In some examples, a UE may signal the far-end device to indicate compression should be established prior to RTP data payload transmission. The far-end device may, upon receipt of this message, initiate initial small payload transmissions as discussed above to establish compression context.

As mentioned above, some types of wireless devices may provide for M2M communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. MTC devices are commonly implemented in LTE networks under a relatively new category of device, referred to as a CAT-M1 device, compared with traditional devices referred to as CAT-1 devices. CAT-M1 devices may have a reduced peak data rate relative to CAT-1 devices, may use a single receive antenna, operate using half duplex frequency division duplexing (FDD) and transmit using a reduced bandwidth of 1.4 MHz relative to a 20 MHz bandwidth of CAT-1 devices. CAT-M1 devices may use a MTC Physical Downlink Control Channel (MPDCCH) for certain downlink control transmissions.

Such CAT-M1 devices may also support deployment in locations with relatively poor channel conditions and may have UEs in a power class of 20 dBM with existing 23 dBM power class devices. CEs may be selected that provide medium coverage enhancement (mode A CE support), or that provide large coverage enhancement (mode B CE support). Additionally, CAT-1 devices may optionally support one or more modes of CE.

While various examples describe CAT-M11 devices as MTC or M2M devices, such devices may also include other types of UEs, such as narrowband wearable devices, alarm panels, display kiosks, and the like. Additionally, in some cases it may be desirable to that such UEs support real-time communications, such as multimedia communications, in addition to MTC communications. Such real-time communications may include, for example, VoLTE or voice over internet protocol (VoIP). Such real-time services may include other services than voice services, such as real-time monitoring, exchange of navigation data, or tracking data services, for example. Additionally, other types of UE, such as CAT-1 UEs, may employ techniques described herein in certain situations, such as in power limited situations or when such a UE is trying to conserve battery power due to a low battery level.

As indicated above, in some cases when certain CE techniques are employed it may be difficult to support real-time communication such as VoLTE on bandwidth restricted devices (e.g., a UE with a LTE CAT M1 modem). For example, a CAT-M1 based UE operating in a CE mode may use packet repetition to meet a link budget. For example, to gain a service footprint comparable to a CAT-1 UE, an uplink repetition pattern of 32 or higher may be suitable to achieve a comparable link budget for a CAT-M1 UE power class. Such CE techniques may present difficulty to support certain real-time services due to, for example, timing requirements for the real-time service. For example, in a real-time VoLTE or VoIP service, voice packets may be generated every 20 ms. Packet repetitions, along with other constraints associated with bandwidth restricted devices, such as half-duplex operation in which time may be allotted for re-tuning between uplink/downlink transmissions, may result in scheduling delays for the real-time data packets.

Additionally, there may be minimum scheduling time constraints between resource allocation grants and scheduling of data transmissions, such as a minimum scheduling time between a MPDCCH grant assigned to a UE and scheduling of data on PDSCH or PUSCH for the UE. Furthermore, in addition to real-time data frames, certain frames may come from the other direction for the real-time data flow. For example, in a voice data flow, voice frames may be transmitted in one direction and silence frames may be transmitted from other direction. Furthermore, real-time transport control protocol (RTCP) data and in-call signaling may further impact the delays. With the current scheduling techniques it may be likely that the scheduling will not meet the real-time data service timelines. For example, per ITU G.114, for good audio experience an end to end delay of less than 400 ms should be maintained. Current LTE networks with CAT 1 VoLTE devices are under and close to this 400 ms end to end delay mark, without leaving much scheduling time for CAT-M1 repetition based scheduling for certain CE modes.

Various aspects of the disclosure provide techniques for reducing additional overhead that may be associated with compression establishment, thereby helping to alleviate some scheduling constraints and providing an enhanced likelihood that a device can comply with identified timelines.

Aspects of the disclosure are initially described in the context of a wireless communications system. Aspects of the disclosure are further illustrated by and described with reference to apparatus diagrams, system diagrams, and flowcharts that relate to header compression for reduced bandwidth wireless devices.

FIG. 1 illustrates an example of a wireless communications system 100 in accordance with various aspects of the present disclosure. Base stations 105 and UEs 115 may, in some examples, provide for enhanced communications of a capacity limited UE 115 during voice calls through establishment of compression context prior to the transmission of real-time data payloads. Such compression context establishment may include, for example, transmitting one or more small payload initial transmissions with uncompressed headers to establish compression context (e.g., a RoHC first order or second order compression state). When a relatively large real-time data payload is subsequently transmitted, a compressed header may be used to reduce the time of the transmission. In some examples, the initial transmissions may be out-of-band transmissions, such as RRS or NAS transmissions.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. A UE 115 may be a device that includes a CAT-1 or CAT-M1 modem, in some examples.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As indicated above, some types of wireless devices may provide for automated communication. Automated wireless devices may include those implementing M2M communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

In certain examples, CAT-M1 devices may have reduced peak data rates (e.g., a maximum transport block size may be 1000 bits). Additionally, such a device may have rank one transmission and one antenna for receiving. This may limit a CAT-M1 UE 115 to half-duplex communication (i.e., the device may not be capable of simultaneously transmitting and receiving). If a UE 115 is half-duplex, it may have relaxed switching time (e.g., from transmission (Tx) to reception (Rx) or vice versa). For example, a nominal switching time for a CAT-1 device may be 20 μs while a switching time for a CAT-M1 device may be 1 ms. MTC enhancements (eMTC) in a wireless system may allow narrowband MTC devices to effectively operate within wider system bandwidth operations (e.g., 1.4/3/5/10/15/20 MHz). For example, an MTC UE 115 may support 1.4 MHz bandwidth (i.e., 6 resource blocks in an LTE system), and may support a frequency hopping pattern within a 20 MHz bandwidth. In some instances, as discussed above, CE may be employed to provide more reliable communications. CEs may include, for example, power boosting (e.g., of up to 15 dB), beam-forming, and bundling of transmit time intervals (TTIs) to provide multiple redundant versions of a transmission.

As indicated above, RoHC may be used for real-time data transmissions to compress header information of a RTP packet. RoHC is a standardized method to compress the IP, UDP, RTP, and Transmission Control Protocol (TCP) headers of internet packets. RoHC header compression operates by allowing both the sender and the receiver to store the static parts of the header (e.g., the IP addresses of the sender/receiver), and to update these only when they change. Dynamic parts (such as the timestamp in the RTP header) are compressed by transmitting only the difference from a reference maintained in both the transmitter and the receiver.

Wireless communications system 100 may, for example, employ TTI bundling to improve a communication link 125 in relatively poor radio conditions or in deployments where UEs 115 may operate using a relatively narrow bandwidth or are in a coverage limited location, such as a basement or at a cell edge. TTI bundling may involve sending multiple redundant copies of the same information in a group of consecutive or non-consecutive TTIs rather than waiting for feedback indicating data was not received before retransmitting redundancy versions. For instance, various physical channels—including the physical broadcast channel (PBCH) and associated messages—may be associated with multiple redundant transmissions to a wireless communications device. In some cases, the number of redundant versions can be on the order of tens of subframes, and different channels may have different redundancy levels.

In some cases LTE networks may be designed for transfer of data packets, and may use a circuit switched fall back for multimedia communications. However, an LTE network may also be used for multimedia communications using a packet based system similar to various VoIP applications (e.g., Skype). This may be accomplished using VoLTE technology. There may be several differences between VoLTE and VoIP. For example, VoLTE service may include an explicit QoS target. To achieve the QoS threshold in poor radio conditions, VoLTE packets may utilize IP-multimedia subsystem (IMS) and other network features to ensure low latency and improved error correction. In cases where a UE 115 is operating using one or more CE techniques, timelines for multimedia communications may be difficult to achieve. In various examples UEs 115 imitating RTP data flows may establish compression context prior to the transmission of real-time data payloads, which may help to achieve required VoLTE timelines and link budget requirements for certain bandwidth limited, power limited, half duplex FDD UEs 115.

Figure 2:
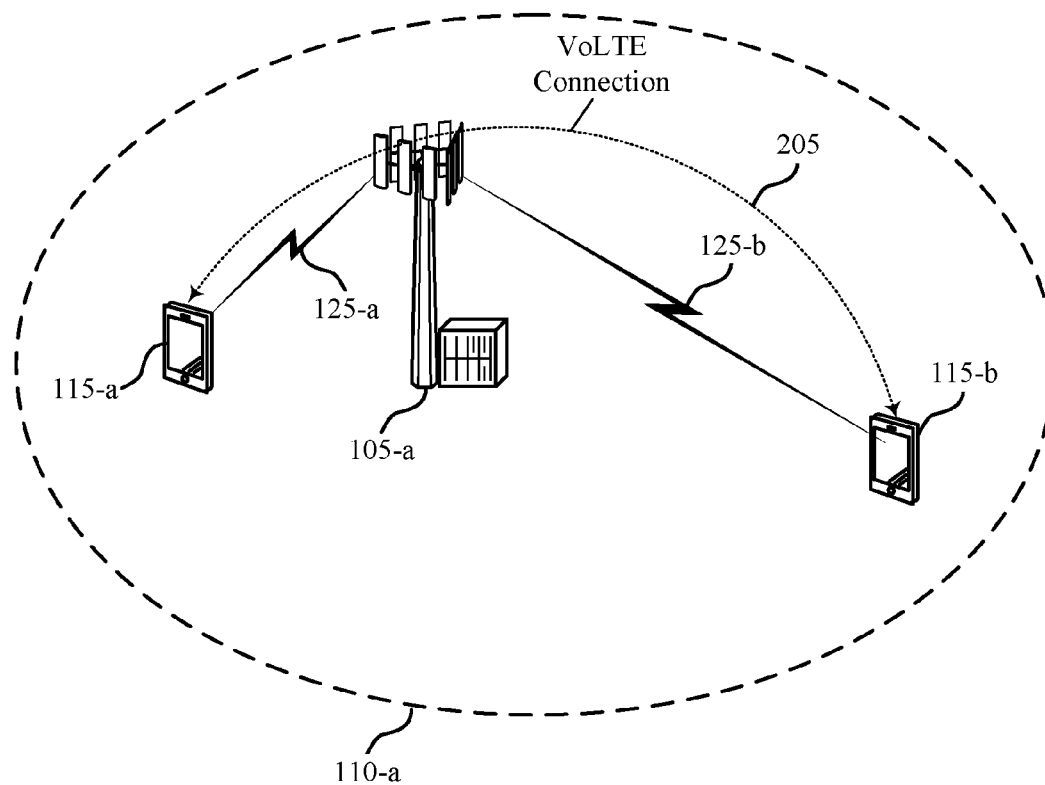
FIG. 2 illustrates an example of a wireless communications system that supports header compression for reduced bandwidth wireless devices in accordance with aspects of the present disclosure.

FIG. 2 illustrates an example of a wireless communications system 200 for header compression for reduced bandwidth wireless devices. Wireless communications system 200 may include a first UE 115-a and a second UE 115-b, which may be examples of a UE 115 described with reference to FIG. 1. For example, as illustrated, one or more of the first UE 115-a or second UE 115-b may be bandwidth restricted or power restricted, or may be operating using one or more CE techniques. Wireless communications system 200 may also include a base station 105-a, which may be an example of a base station 105 described above with reference to FIG. 1. The base station 105-a may transmit control and data to any UE 115 within its geographic coverage area 110-a via a communication links 125. For example, communication link 125-a may allow for bidirectional communication between the first UE 115-a and the base station 105-a, and communication link 125-b may allow for bidirectional communication between the second UE 115-b and the base station 105-a. In some examples, a real-time connection may be established between the first UE 115-a and the second UE 115-b, such as VoLTE connection 205.

The VoLTE connection 205 may be established through a data flow, that may include voice packets and other packets such as one or more of a SID packet, or RTCP data. In some examples, the voice communication may be negotiated as a full duplex or half duplex VoIP or VoLTE call. Timelines for real-time data communications may be achieved, in some examples, by establishing a compression context for the data flow prior to the transmission of packets with real-time multimedia data as a payload. For example, the first UE 115-a may be bandwidth restricted or power limited (e.g., a CAT-M1 UE or a CAT-1 UE that is power limited). The first UE 115-a may establish VoLTE connection 205 with second UE 115-b via base station 105-a, and one or more of the UEs 115 may use one or more techniques described herein to establish compression context prior to transmission of a real-time data payload. While various examples described herein reference RTP multimedia communications, techniques described herein may be used in any situation where congestion in a link is sensed such that link capacity of a connection may become overwhelmed prior to establishment of full compression context.

In some examples, base station 105-a may pre-emptively transmit one or more initial transmissions prior to transmitting a real-time payload. Such an initial transmission may include a small payload, that is smaller than typical real-time data payloads, that may be used to establish compression context for the data flow. Such a small payload may be smaller than an average RTP payload, and in some examples may include a SID packet, a small simulated voice payload, an RTP extension header extension profile, one or more RTP voice profiles with a defined number of codec frame bits (e.g., more than or as few as the lowest number of codec frame bits allowed by a codec), or any combination thereof. In an example, the one or more initial transmissions may be a zero bit codec frame. A zero bit codec frame type in an enhanced variable rate codec (EVRC) or a selectable mode vocoder (SMV) may be referred to as the Null frame, which may be generated when a vocoder is running at rate 0. The RTP voice profile may specify one or more parameters of a data flow (e.g., a sampling rate, a code rate, the number of bits per frame, or the like). In some cases, base station 105-a may identify one or more initial transmissions as compression scheme establishment transmissions and drop the one or more initial transmissions from the data flow. When actual real-time data, such as multimedia data, is to be transmitted, it can be transmitted with the established compression context and therefore transmitted in a reduced time relative to an uncompressed transmission. In some examples, such initial transmissions may be transmitted upon initiation of the data flow.

In some examples, out-of-band communications may be used to establish the compression context, such as communications using RRC or NAS signaling. For example, a MAC control element may carry the initial context information between UE and base station, such as where the UE starts and increments its RTP sequence number and timestamp, which may be used to establish compression context, such as first order or second order RoHC context.

As indicated above, compression context also may need to be established when a UE 115 is handed over from a source to a target base station 105. In some examples, on detecting handoff, a UE 115-a can initiate either the initial small payload transmissions, or out-of-band signaling, to establish compression prior to transmission of real-time data payloads. In some examples, the source base station 105 may transfer the compression context to the target base station to establish compression prior to transmission of real-time data payloads.

In some examples, a far-end device, such as UE 115-*b*, may also assist with preemptive compression context set up. In some examples, an initiating UE 115-*a* may signal the far-end UE 115-*b* to indicate compression should be established prior to RTP data payload transmission. The far-end UE 115-*b* may, upon receipt of this message, initiate initial small payload transmissions as discussed above to establish compression context.

Figure 3:
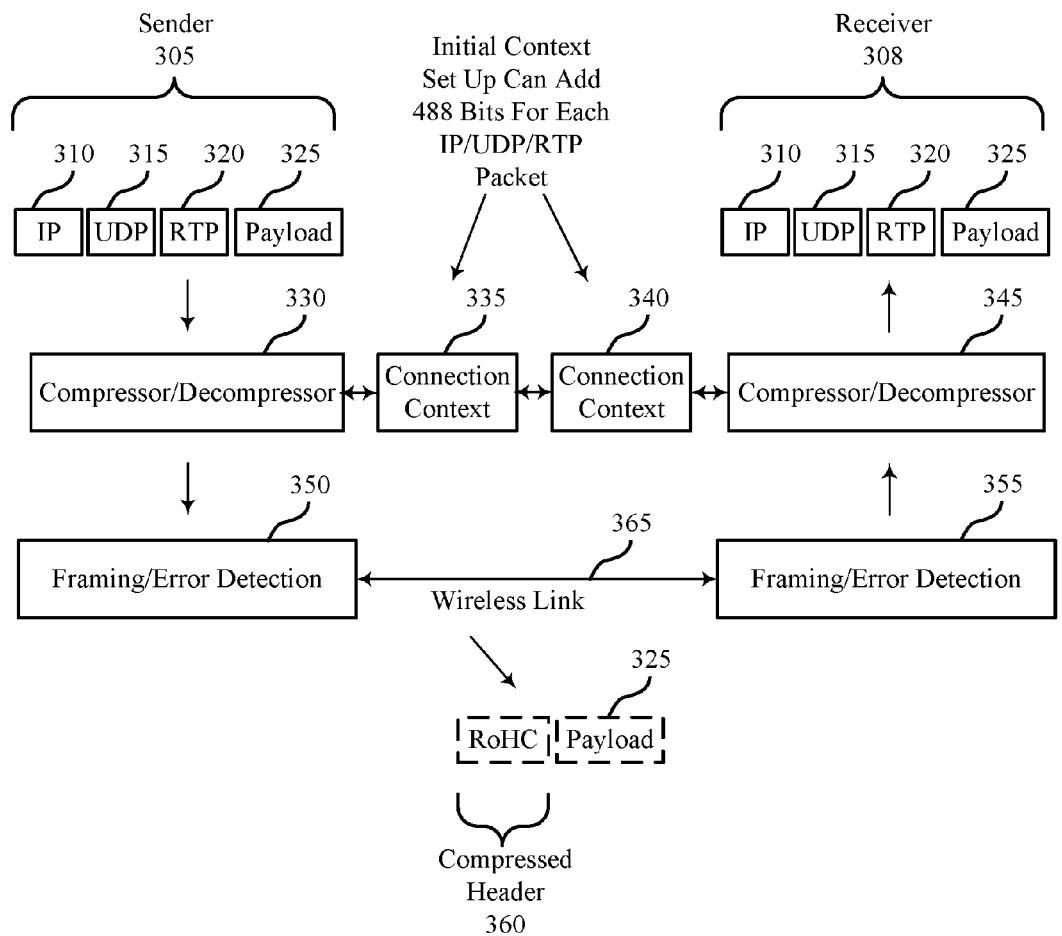
FIG. 3 illustrates an example of RoHC establishment in accordance with aspects of the present disclosure.

FIG. 3 illustrates an example of RoHC establishment 300 for header compression for reduced bandwidth wireless devices. The RoHC establishment 300 be implemented in UEs that may utilize half-duplex calling techniques employed within the systems 100 or 200 of FIG. 1 or 2.

When establishing a compression context (e.g., a RoHC context), a sender 305 may transmit RTP packets to a receiver 308. In some examples, sender 305 may be located in UE 115-*a*, and receiver 308 may be located in UE 115-*b*. The RTP packets may include an IP header 310, UDP header 315, RTP header 320, and a real-time data payload 325. The packet may be provided, at the sender 305 to a compressor/decompressor 330, which may compress the IP header 310, UDP header 315, and RTP header 320 according to connection context 335. The compressor/decompressor 330 may include a state machine that defines three states, namely an initialization and refresh (IR) state, a first order (FO) state, and a second order (SO) state. The state machine may move through the states using initial context set up associated with the full header information for the RTP packet, which in some examples can add up to 488 bits per packet. In the event that full headers are transmitted along with a relatively large real-time data payload, time constraints associated with the RTP data flow may be encountered. However, after compression, 64 bytes of header information may be reduced to 3 bytes header information (488 fewer bits). which may help achieve RTP time constraints for RTP data flows. Following the compression at the sender, the packet is provided to framing and error detection 350, and the compressed RTP packet may be transmitted using wireless link 365 to receiver 308. The compressed RTP packet may include a RoHC compressed header 360 and the real-time data payload 325, which may be received at the receiver 308 framing and error detection component 355. The packet may then be decompressed at compressor/decompressor 345 using connection context 340 at the receiver 308, to provide the uncompressed RTP packet.

Figure 4:
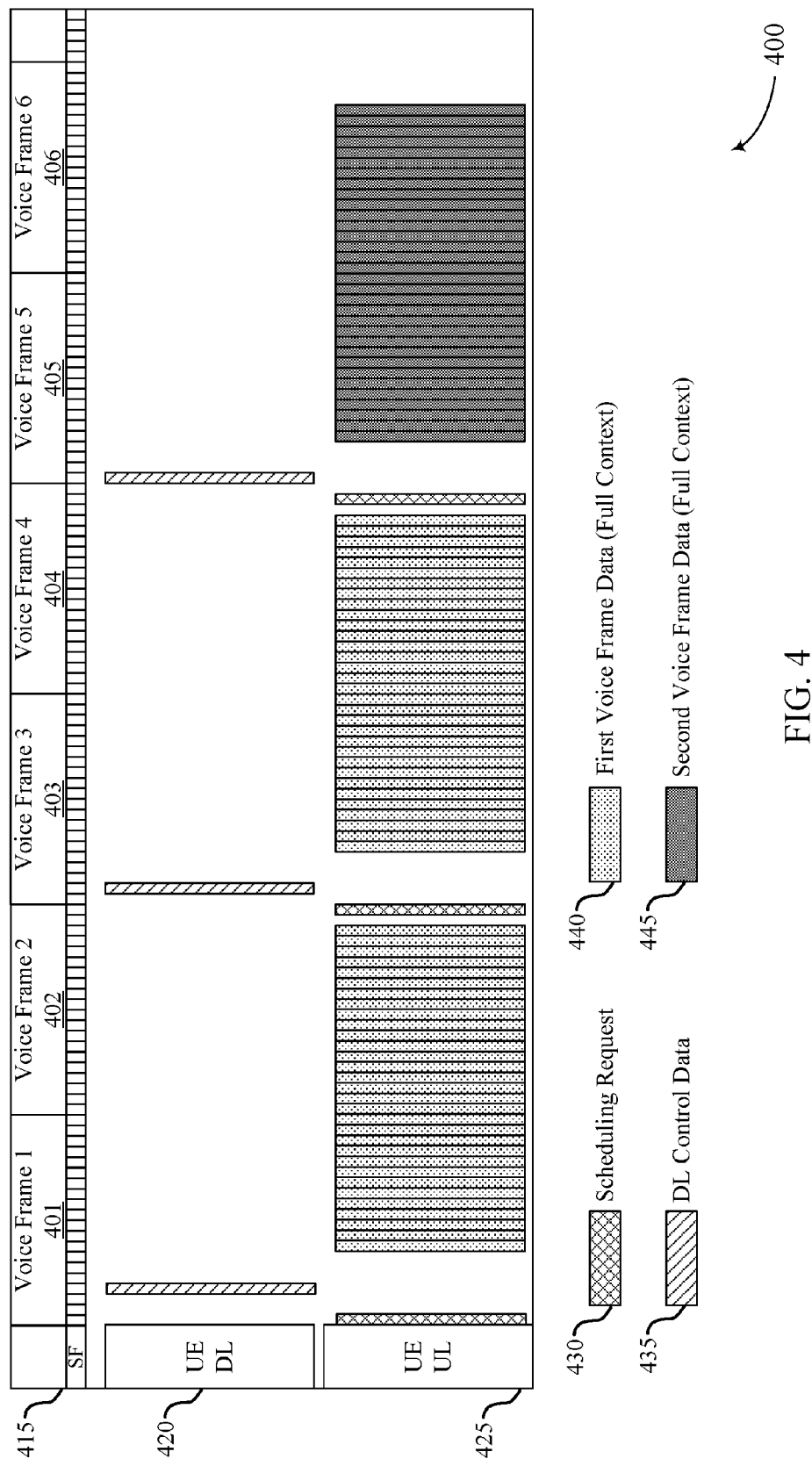
FIG. 4 illustrates an example of an uplink time delay budget in accordance with aspects of the present disclosure.

As indicated above, in cases where an uncompressed header may be transmitted with real-time data payload in a RTP data flow, RTP time constraints may be exceeded. FIG. 4 illustrates an example of a time delay budget 400 for a data flow for uplink talk frames. The time delay budget 400 in this example may utilize a first CE level employed within the systems 100 or 200 of FIG. 1 or 2. In this example, a first 20 ms voice frame 401, a second 20 ms voice frame 402, a third 20 ms voice frame 403, a fourth 20 ms voice frame 404, a fifth 20 ms voice frame 405, and a sixth 20 ms voice frame 406, are illustrated.

In this example, uplink talk data may be transmitted by a UE, and downlink talk data may be received at the UE. Data may be transmitted in subframes 415 associated with each voice frame 401-406, which may include half-duplex UE downlink transmissions 420 and UE uplink transmissions 425. In this example, the UE (e.g., a UE 115 of FIGS. 1-3) may transmit bundled voice packets, and transmit a scheduling request (SR) 430 to the base station. The UE may receive downlink control data 435 that may include an uplink grant for transmission of the voice data. In this example, first voice frame data 440 with full context may be transmitted, in which the voice frame is split into two transport blocks (TBs) for scheduling due to size limitations that result from the full header.

After a cross subframe scheduling delay, a first portion of uplink first voice frame data 440 with full context transmissions may be transmitted. Following an initial transmission of uplink first voice frame data 440, which may be completed in the second voice frame 402, a SR 430 may be transmitted, followed by downlink control data 435. A second portion of the first voice frame data 440 may be transmitted, that may span the third voice frame 403, the fourth voice frame 404, followed by another SR 430. A first transmission of second voice frame data 445, with full context, may start in the fifth voice frame 405, rather than in the third voice frame 403, due to the first voice frame data 440 still being transmitted. Thus, a delay in the RTP data flow timeline is introduced. Subsequent voice frames will get a delay, for example, as the second voice frame data 445 is scheduled in the fifth subframe 405 rather than the third subframe 403 shown in the figure, and this delay will accumulate and potentially degrade the RTP data flow.

As discussed above, in some examples one or more initial transmissions with a small payload may be transmitted to establish compression context. Such initial transmissions may be completed within two voice frames, and may provide reduced time delays for transmissions of real-time data payload packets. In such examples, the data flow timelines may be maintained more easily in the event that the UE is using a CE level having a relatively high number of repetitions.

Figure 5:
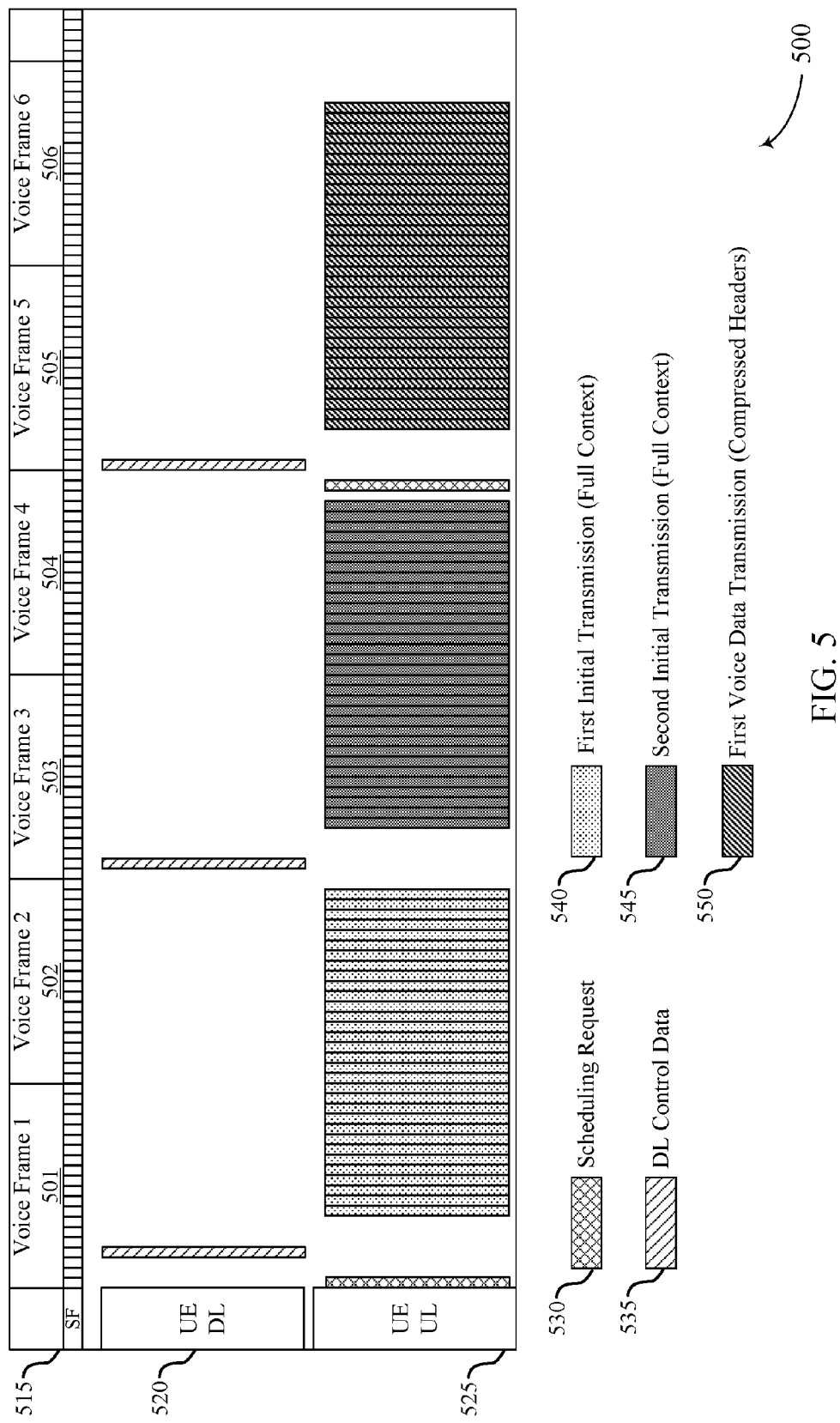
FIG. 5 illustrates an example of an uplink time delay budget using header compression techniques in accordance with aspects of the present disclosure.

FIG. 5 illustrates an example of a time delay budget 500 for a data flow for uplink talk frames in which initial small-payload transmissions are used to establish compression context. The time delay budget 500 in this example may again utilize a first CE level employed within the systems 100 or 200 of FIG. 1 or 2. In this example, a first 20 ms voice frame 501, a second 20 ms voice frame 502, a third 20 ms voice frame 503, a fourth 20 ms voice frame 504, a fifth 20 ms voice frame 505, and a sixth 20 ms voice frame 506, are illustrated.

In this example, uplink talk data may be transmitted by a UE, and downlink talk data may be received at the UE. Data may be transmitted in subframes 515 associated with each voice frame 501-506, which may include half-duplex UE downlink transmissions 520 and UE uplink transmissions 525. In this example, the UE (e.g., a UE 115 of FIGS. 1-3) may transmit bundled voice packets, and transmit a SR 530 to the base station. The UE may receive downlink control data 535 that may include an uplink grant for transmission of the voice data. In this example, a first initial transmission 540 with full context may be transmitted, in which the initial transmission has a payload that is small enough to provide transmission of the first initial transmission 540 by the end of the second voice frame 502. In some examples, the first initial transmission 540 is transmitted before a first voice frame is ready, and may be a SID frame or RTP frame with a low negligible payload sent with full context headers such that the link completes within the delay budget.

Following the first initial transmission 540, which may be completed in the second voice frame 502, downlink control data 535 may be received. A second initial transmission 545 may then be transmitted, which may include a small payload such that the second initial transmission 545 may be completed by the end of the fourth voice frame 504. This transmission may be followed by another SR 530 and subsequent downlink control data 535. The first initial transmission 540 and second initial transmission 545 may be used to establish a compression context, and a first voice data transmission 550 may then be transmitted, using compressed headers. The first voice data transmission 550 may start in the fifth voice frame 505, rather than a later frame. Thus, the delay in the RTP data flow timeline associated with the full compression context is avoided, and time constraints associated with the RTP data flow may be more likely to be achieved. In some examples, one or more additional context establishing frames, such as the second initial transmission 545, can be sent based on a priori information of decompressor behavior, and may stop. The additional context establishing frames, such as the second initial transmission 545, may be discontinued when either first order or second order compression state is reached or may be discontinued based at least in part on an amount of buffered real-time multimedia data (e.g., voice or video data, true RTP "speech" has arrived). If true RTP "speech" has arrived, or at least a defined amount of RTP "speech" data has been buffered that exceeds a data threshold, the speech payload may be transmitted. Alternatively to meet the RTP delay timelines even if RTP "speech" has arrived (e.g., an amount of buffered RTP "speech" data does not exceed a data threshold), the UE may decide to continue send one or more additional context establishing frames and may drop some RTP speech frames to meet the timeline to avoid RTP delay.

Figure 6:
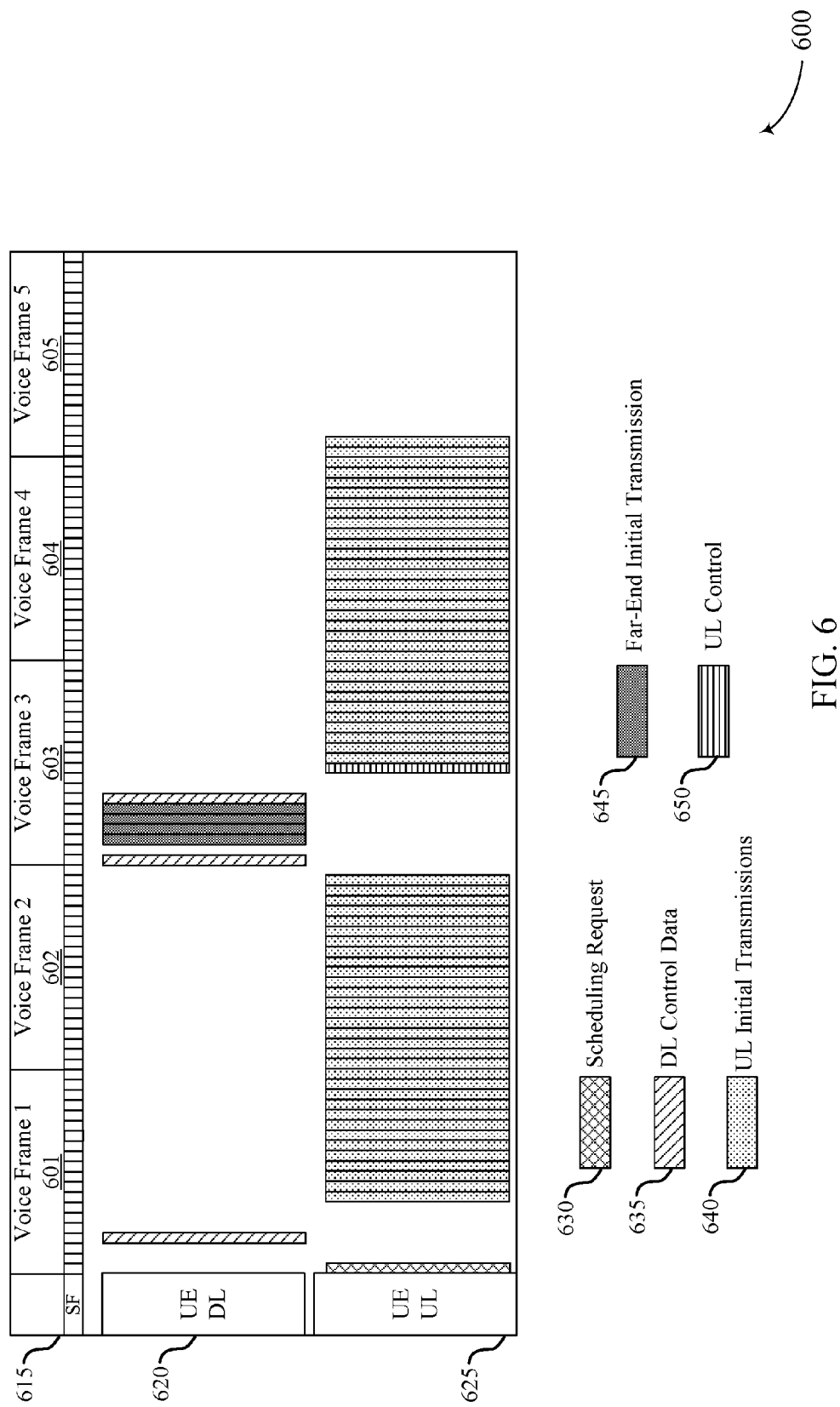
FIG. 6 illustrates an example of an uplink and downlink time delay budget using header compression techniques in accordance with aspects of the present disclosure.

FIG. 6 illustrates an example of an uplink and downlink time delay budget 600 for header compression for near-end and far-end devices. The time delay budget 600 in this example may again utilize a first CE level employed within the systems 100 or 200 of FIG. 1 or 2. In this example, a first 20 ms voice frame 601, a second 20 ms voice frame 602, a third 20 ms voice frame 603, a fourth 20 ms voice frame 604, and a fifth 20 ms voice frame 605, are illustrated.

In this example, uplink talk data may be transmitted by a UE, and downlink talk data may be received at the UE. Data may be transmitted in subframes 615 associated with each voice frame 601-605, which may include half-duplex UE downlink transmissions 620 and UE uplink transmissions 625. In this example, the UE (e.g., a UE 115 of FIGS. 1-2) may transmit bundled voice packets, and transmit a SR 630 to the base station. The UE may receive downlink control data 635 that may include an uplink grant for transmission of the voice data. In this example, a first UL initial transmission 640 with full context may be transmitted, in which the initial transmission has a payload that is small enough to provide transmission of the first UL initial transmission 640 by the end of the second voice frame 602. In some examples, the first UL initial transmission 640 is transmitted before a first voice frame is ready, and may be a SID frame or RTP frame with a low negligible payload sent with full context headers such that the link completes within the delay budget.

Following the first UL initial transmission 640, which may be completed in the second voice frame 602, downlink control data 635 may be received, followed by a far-end initial transmission 645. The far-end initial transmission 645 may repeat one or more times until a full compression state is achieved. Following the far-end initial transmission 645, an uplink control transmission 650 may be transmitted, followed by a second UL initial transmission 640, which also may include a small payload such that the second UL initial transmission 640 may be completed before the end of the fifth voice frame 605. The UL initial transmissions 640, along with the far-end initial transmission 645 may be used to establish a compression context, and a voice data transmissions may then be transmitted between the UE and the far-end UE, using compressed headers. The voice data transmissions may start in the sixth voice frame 606, rather than a later frame. Thus, the delay in the RTP data flow timeline associated with the full compression context is avoided, and time constraints associated with the RTP data flow may be more likely to be achieved. Similarly as discussed above, in some examples the one or more additional context establishing frames, such as the second UL initial transmission 640, can be sent based on a priori information of decompressor behavior, and may stop when either first order or second order compression is reached or unless true RTP "speech" has arrived, in which case the speech payload may be transmitted. In some examples, a mobile call originator device may give preference to DL context establishment in calls that require a receiver's voice acknowledgement.

Figure 7:
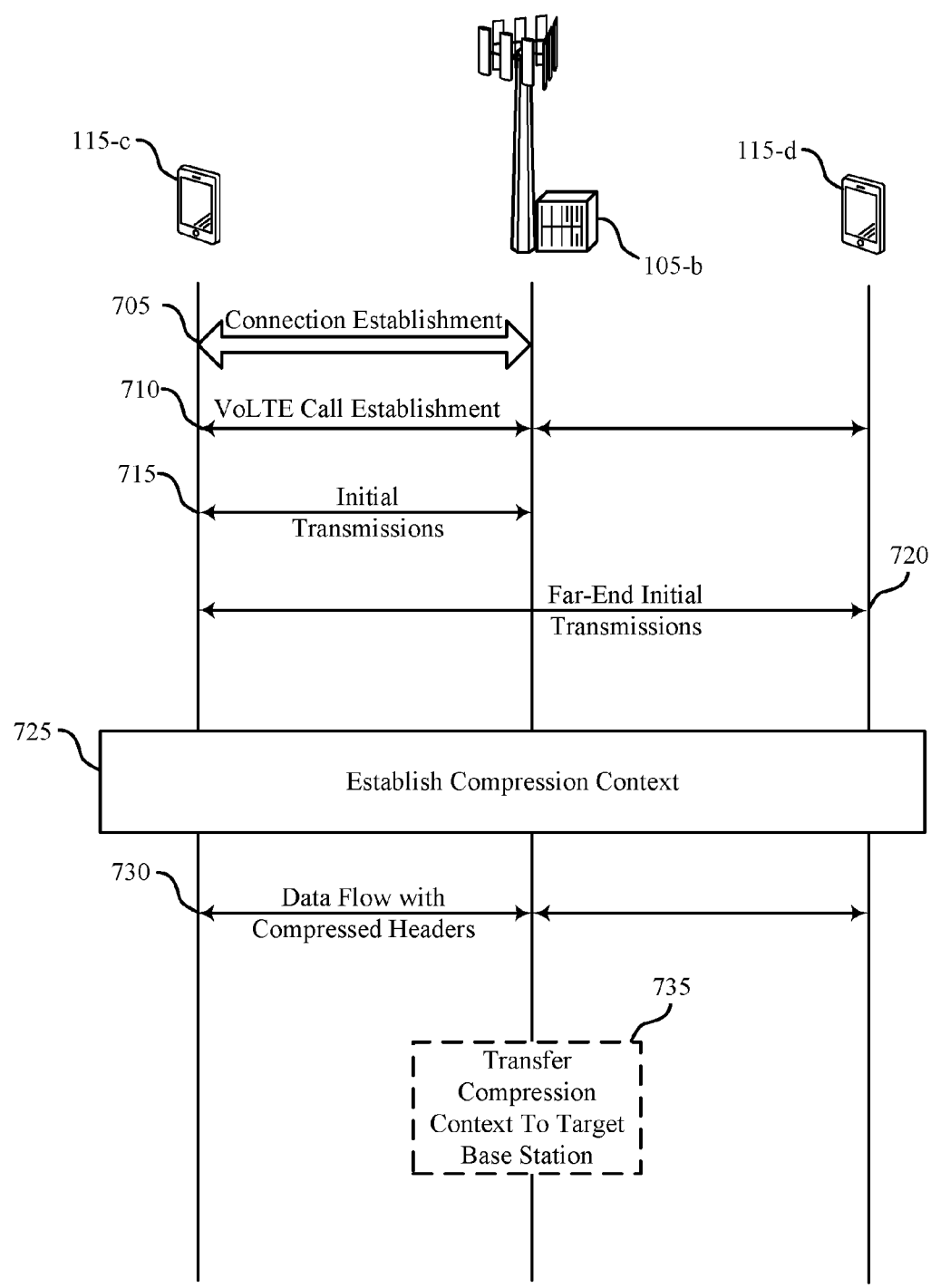
FIG. 7 illustrates an example of a process flow that supports header compression for reduced bandwidth wireless devices in accordance with aspects of the present disclosure.

FIG. 7 illustrates an example of a process flow 700 for header compression for reduced bandwidth wireless devices. The diagram 700 may illustrate aspects of header compression techniques employed within the systems 100 or 200 of FIG. 1 or 2. The diagram 700 includes a first UE 115-c, a second UE 115-d, and a base station 105-b, which may be examples of UEs 115 and base stations 105 of FIGS. 1-2. One or both of the UEs 115 may be a CAT-M1 device or may have a channel quality metric that is below a threshold value, and thus the UEs 115 and the base station 105-b may be employing CE techniques. The first UE 115-b may establish a connection 705, and the second UE 115-c may already have a connection established through the base station 105-b or another serving base station. UE 115-c and UE 115-d may perform a VoLTE call establishment 710, which may initiate a real-time data flow between the first UE 115-c and second UE 115-d.

The first UE 115-c may transmit one or more initial transmissions 715, to establish a compression context. The first UE 115-c in this example may also indicate to the far-end second UE 115-d to transmit one or more far-end initial transmissions 720, in order to establish a compression context with the far end second UE 115-d and on the downlink for first UE 115-c and base station 105-b. At block 725, the UEs 115 and base station 105-b may establish compression context, such as a second order RoHC context. The UEs 115 and base station 105-b may then transmit a data flow 730 with compressed headers. In the event of a handover, the base station 105-b may optionally transfer a compression context to a target base station for use in transmissions following the handover. In other examples, the first UE 115-c may, upon a handover, initiate initial transmissions as discussed above to establish compression context prior to multimedia data being transmitted following the handover. In some examples, the initial transmissions 715 are out-of-band transmissions, such as RRC or NAS transmissions.

Figure 8:
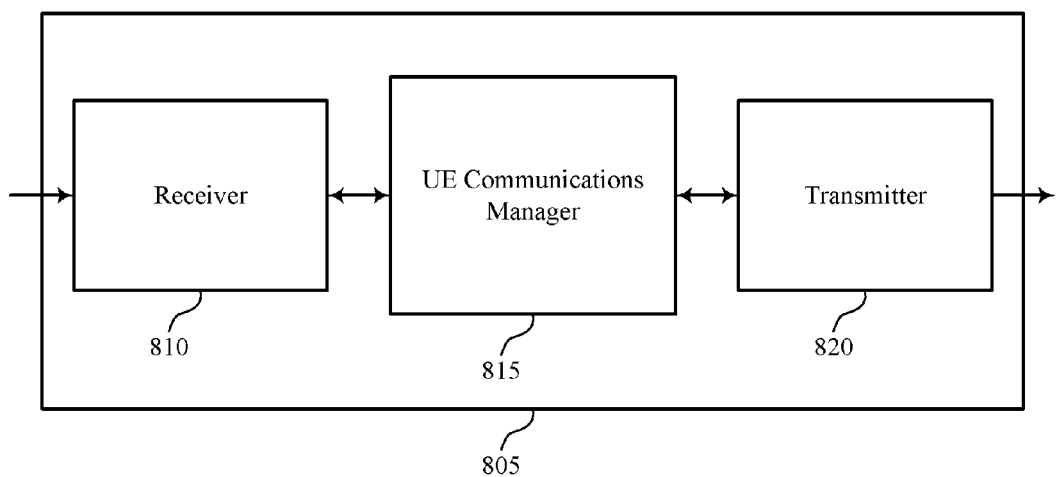
FIGS. 8 through 10 show diagrams of a device that supports header compression for reduced bandwidth wireless devices in accordance with aspects of the present disclosure.

FIG. 8 shows a diagram 800 of a wireless device 805 that supports header compression for reduced bandwidth wireless devices in accordance with various aspects of the present disclosure. Wireless device 805 may be an example of aspects of a UE 115 as described with reference to FIG. 1. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to header compression for reduced bandwidth wireless devices, etc.). Information may be passed on to other components of the device. The receiver 810 may be an example of aspects of the transceiver 1135 described with reference to FIG. 11.

UE communications manager 815 may be an example of aspects of the UE communications manager 1115 described with reference to FIG. 11. UE communications manager 815 may initiate a data flow (e.g., an IP flow) containing real-time multimedia data (e.g., voice data) between a UE and a base station and transmit, prior to a first multimedia data transmission of the data flow between the UE and the base station, one or more initial transmissions to establish a compression scheme for the data flow.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
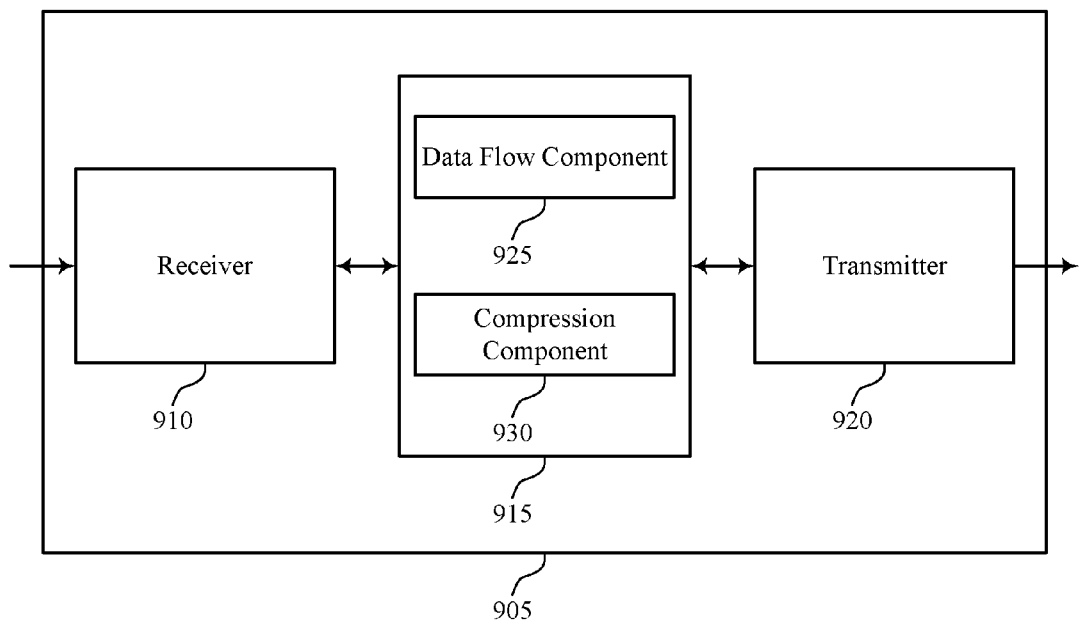

FIG. 9 shows a diagram 900 of a wireless device 905 that supports header compression for reduced bandwidth wireless devices in accordance with various aspects of the present disclosure. Wireless device 905 may be an example of aspects of a wireless device 805 or a UE 115 as described with reference to FIGS. 1 and 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to header compression for reduced bandwidth wireless devices, etc.). Information may be passed on to other components of the device. The receiver 910 may be an example of aspects of the transceiver 1135 described with reference to FIG. 11.

UE communications manager 915 may be an example of aspects of the UE communications manager 1115 described with reference to FIG. 11. UE communications manager 915 may also include data flow component 925 and compression component 930.

Data flow component 925 may initiate a data flow, such as an IP flow, containing real-time multimedia data (e.g., voice data, video data) between a UE and a base station and transmit. In some examples, as part of a call set up, data flow component 925 may transmit an indication to the far-end device to establish the compression scheme prior to the first multimedia data transmission of the data flow. In some cases, the indication prompts the far-end device to transmit the one or more initial transmissions to establish a RoHC context for header compression of packets in the data flow.

Compression component 930 may transmit, prior to a first multimedia data transmission of the data flow between the UE and the base station, one or more initial transmissions to establish a compression scheme for the data flow and establish a RoHC context for header compression of packets in the data flow based on the one or more initial transmissions. In some cases, the established RoHC context corresponds to a first order or a second order RoHC state. In some cases, one or more portions of header compression information for the data flow, UDP header fields, or RTP header fields including sequence number and timestamp, for the first multimedia data transmission are determined based on the information in a MAC message.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
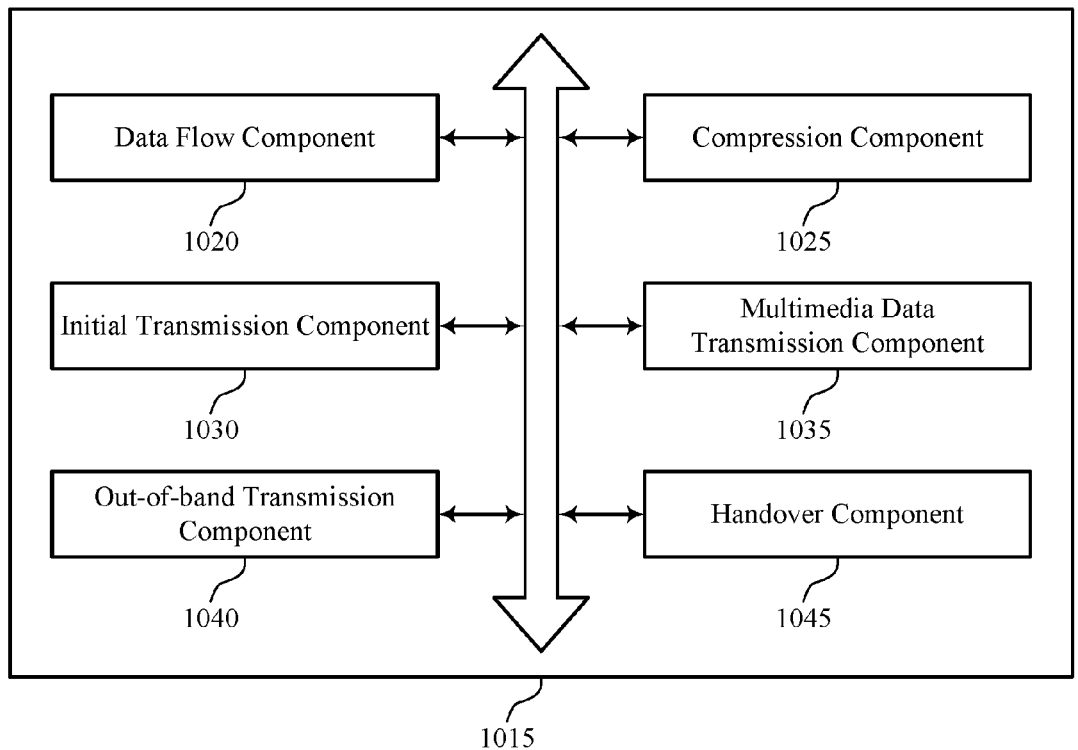

FIG. 10 shows a diagram 1000 of a UE communications manager 1015 that supports header compression for reduced bandwidth wireless devices in accordance with various aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include data flow component 1020, compression component 1025, initial transmission component 1030, multimedia data transmission component 1035, out-of-band transmission component 1040, and handover component 1045. Each of these modules may communicate, directly or indirectly, with one another (e.g., via one or more buses).

Data flow component 1020 may initiate a data flow, such as an IP flow, containing real-time multimedia data (e.g., voice data, video data) between a UE and a base station and transmit. In some examples, as part of a call set up, data flow component 1020 may transmit an indication to a far-end device to establish the compression scheme prior to the first multimedia data transmission of the data flow. In some cases, the indication prompts the far-end device to transmit the one or more initial transmissions to establish a RoHC context for header compression of packets in the data flow.

Compression component 1025 may transmit, prior to a first multimedia data transmission of the data flow between the UE and the base station, one or more initial transmissions to establish a compression scheme for the data flow and establish a RoHC context for header compression of packets in the data flow based on the one or more initial transmissions. In some cases, the established RoHC context corresponds to a first order or a second order RoHC state. In some cases, one or more portions of header compression information for the data flow, UDP header fields, or RTP header fields including sequence number and timestamp, for the first multimedia data transmission are determined based on the information in the MAC message.

Initial transmission component 1030 may discontinue the one or more initial transmissions when the compression scheme corresponds to a first order compression state or a second order compression state, based on an amount of buffered real-time multimedia data. In some cases, the one or more initial transmissions includes one or more SID packet transmissions. In some cases, the one or more initial transmissions includes one or more voice packets that include a simulated voice payload having a payload size that is smaller than an average voice packet payload size. In some cases, the one or more initial transmissions includes one or more one or more silence indicator description (SID) packet transmissions, or one or more voice packets that include a simulated voice payload, or one or more RTP extension header extension profiles, or one or more RTP voice profiles with a defined number of codec frame bits, the one or more initial transmissions having a payload size that is smaller than an average voice packet payload size. In some cases, the defined number of codec frame bits may include more than or as few as the lowest number of codec frame bits allowed by the codec. The RTP voice profile may specify one or more parameters of a data flow (e.g., a sampling rate, a code rate, the number of bits per frame, or the like).

Multimedia data transmission component 1035 may transmit the first multimedia data transmission using the established RoHC context. Out-of-band transmission component 1040 may initiate one or more out-of-band transmissions that establish the compression scheme for the data flow. In some cases, the one or more out-of-band transmissions include one or more RRC transmissions or one or more NAS messages. In some cases, the one or more out-of-band transmissions includes a MAC message that includes information to establish a RoHC context for header compression of packets in the data flow.

Handover component 1045 may initiate a handover between a first base station and a second base station, and initiate one or more initial transmissions between the UE and the second base station.

Figure 11:
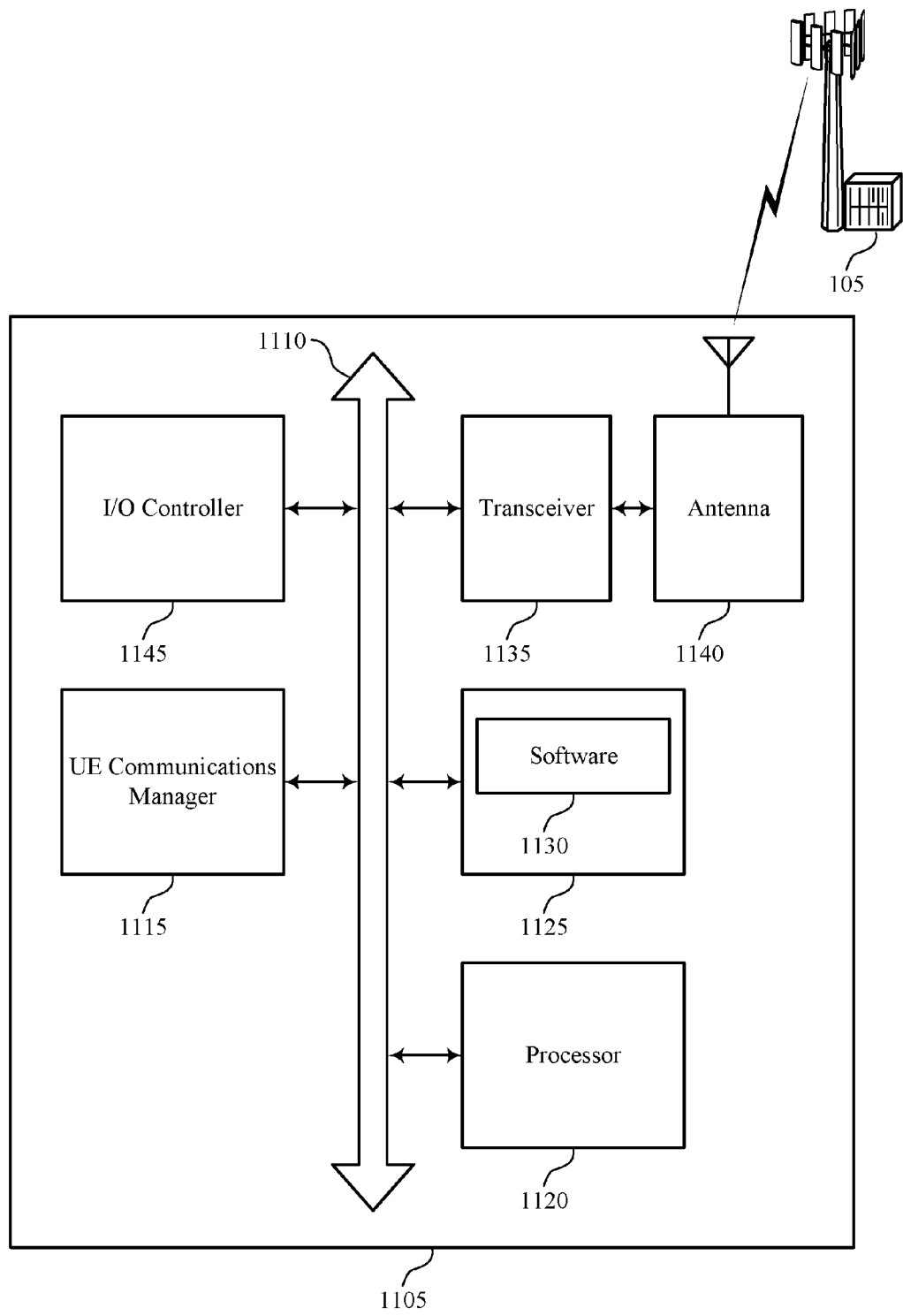
FIG. 11 illustrates a diagram of a system including a UE that supports header compression for reduced bandwidth wireless devices in accordance with aspects of the present disclosure.

FIG. 11 shows a diagram of a system 1100 including a device 1105 that supports header compression for reduced bandwidth wireless devices in accordance with various aspects of the present disclosure. Device 1105 may be an example of or include the components of wireless device 805, wireless device 905, or a UE 115 as described above, (e.g., with reference to FIGS. 1, 8 and 9). Device 1105 may include components for bi-directional multimedia and data communications including components for transmitting and receiving communications, including UE communications manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting header compression for reduced bandwidth wireless devices).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support header compression for reduced bandwidth wireless devices. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
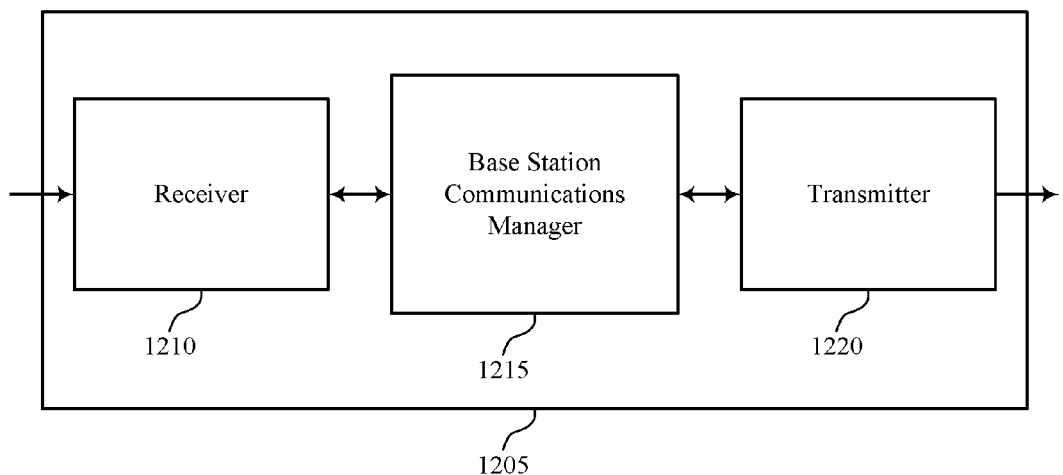
FIGS. 12 through 14 show diagrams of a device that supports header compression for reduced bandwidth wireless devices in accordance with aspects of the present disclosure.

FIG. 12 shows a diagram 1200 of a wireless device 1205 that supports header compression for reduced bandwidth wireless devices in accordance with various aspects of the present disclosure. Wireless device 1205 may be an example of aspects of a base station 105 as described with reference to FIG. 1. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to header compression for reduced bandwidth wireless devices, etc.). Information may be passed on to other components of the device. The receiver 1210 may be an example of aspects of the transceiver 1535 described with reference to FIG. 15.

Base station communications manager 1215 may be an example of aspects of the base station communications manager 1515 described with reference to FIG. 15. Base station communications manager 1215 may identify a data flow, such as an IP flow, containing real-time multimedia data (e.g., voice data, video data) that is to be initiated with a UE and receive, prior to a first multimedia data transmission of the data flow from the UE, one or more initial transmissions to establish a compression scheme for the data flow.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
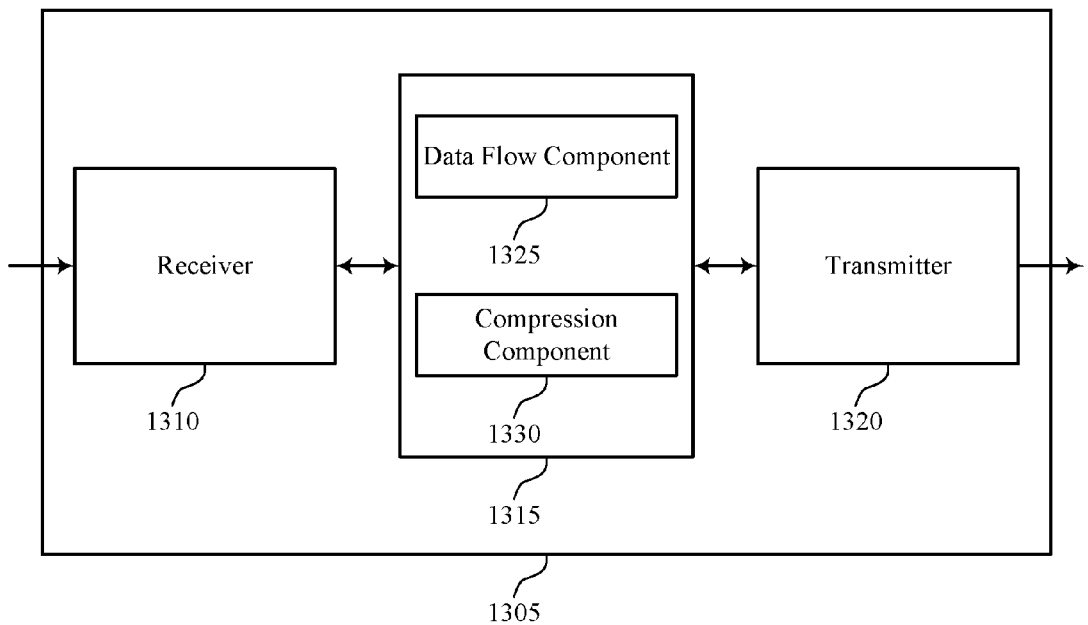

FIG. 13 shows a diagram 1300 of a wireless device 1305 that supports header compression for reduced bandwidth wireless devices in accordance with various aspects of the present disclosure. Wireless device 1305 may be an example of aspects of a wireless device 1205 or a base station 105 as described with reference to FIGS. 1 and 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to header compression for reduced bandwidth wireless devices, etc.). Information may be passed on to other components of the device. The receiver 1310 may be an example of aspects of the transceiver 1535 described with reference to FIG. 15.

Base station communications manager 1315 may be an example of aspects of the base station communications manager 1515 described with reference to FIG. 15. Base station communications manager 1315 may also include data flow component 1325 and compression component 1330.

Data flow component 1325 may identify a data flow, such as an IP flow, containing real-time multimedia data (e.g., voice data, video data) that is to be initiated with a UE. Compression component 1330 may receive, prior to a first multimedia data transmission of the data flow from the UE, one or more initial transmissions to establish a compression scheme for the data flow, establish a RoHC context for header compression of packets in the data flow based on the one or more initial transmissions, and receive the first multimedia data transmission using the established RoHC context.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
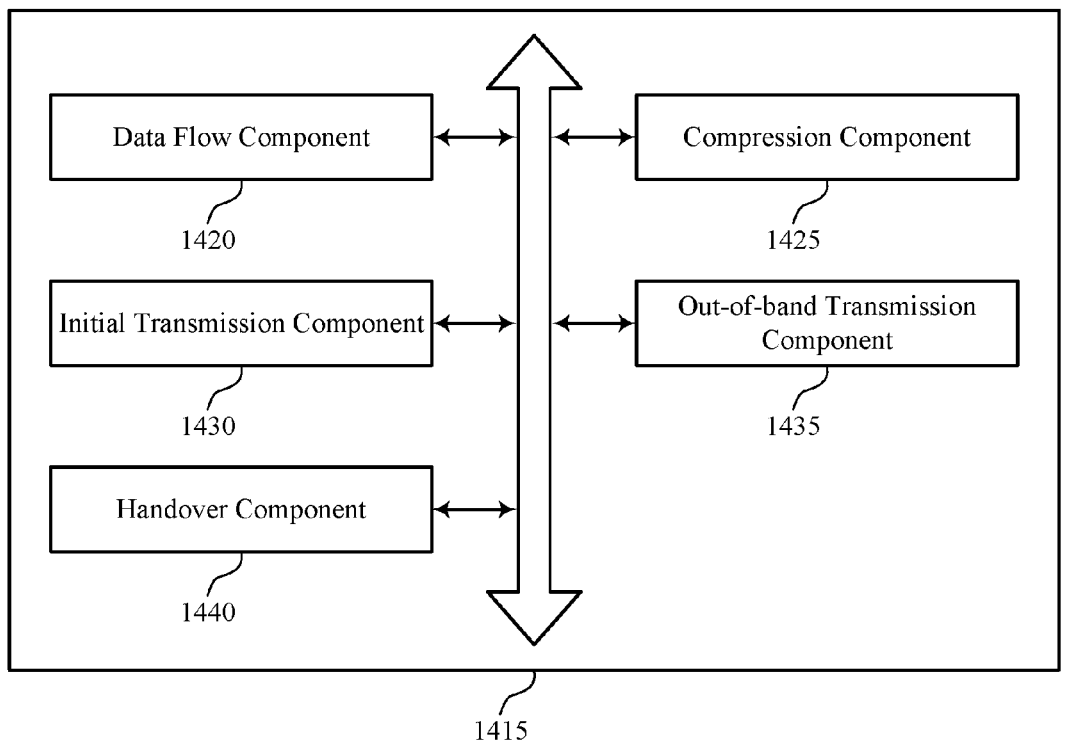

FIG. 14 shows a diagram 1400 of a base station communications manager 1415 that supports header compression for reduced bandwidth wireless devices in accordance with various aspects of the present disclosure. The base station communications manager 1415 may be an example of aspects of a base station communications manager 1515 described with reference to FIGS. 12, 13, and 15. The base station communications manager 1415 may include data flow component 1420, compression component 1425, initial transmission component 1430, out-of-band transmission component 1435, and handover component 1440. Each of these modules may communicate, directly or indirectly, with one another (e.g., via one or more buses).

Data flow component 1420 may identify a data flow, such as an IP flow containing real-time multimedia data (e.g., voice data, video data) that is to be initiated with a UE.

Compression component 1425 may receive, prior to a first multimedia data transmission of the data flow from the UE, one or more initial transmissions to establish a compression scheme for the data flow, establish a RoHC context for header compression of packets in the data flow based on the one or more initial transmissions, and receive the first multimedia data transmission using the established RoHC context.

Initial transmission component 1430 may identify the one or more initial transmissions as compression scheme establishment transmissions and drop the one or more initial transmissions from the data flow. In some cases, the one or more initial transmissions includes one or more SID packet transmissions or one or more voice packets that include a simulated voice payload having a payload size that is smaller than an average voice packet payload size. In some cases, the one or more initial transmissions are discontinued when the compression scheme corresponds to a first order state or a second order state, or based on an amount of buffered real-time multimedia data.

Out-of-band transmission component 1435 may initiate one or more out-of-band transmissions that establish the compression scheme for the data flow. In some cases, the one or more out-of-band transmissions include one or more RRC transmissions or one or more NAS messages.

Handover component 1440 may perform a handover from a source base station to a target base station, and the one or more initial transmissions include a RoHC context for header compression of packets in the data flow that is established at the source base station.

Figure 15:
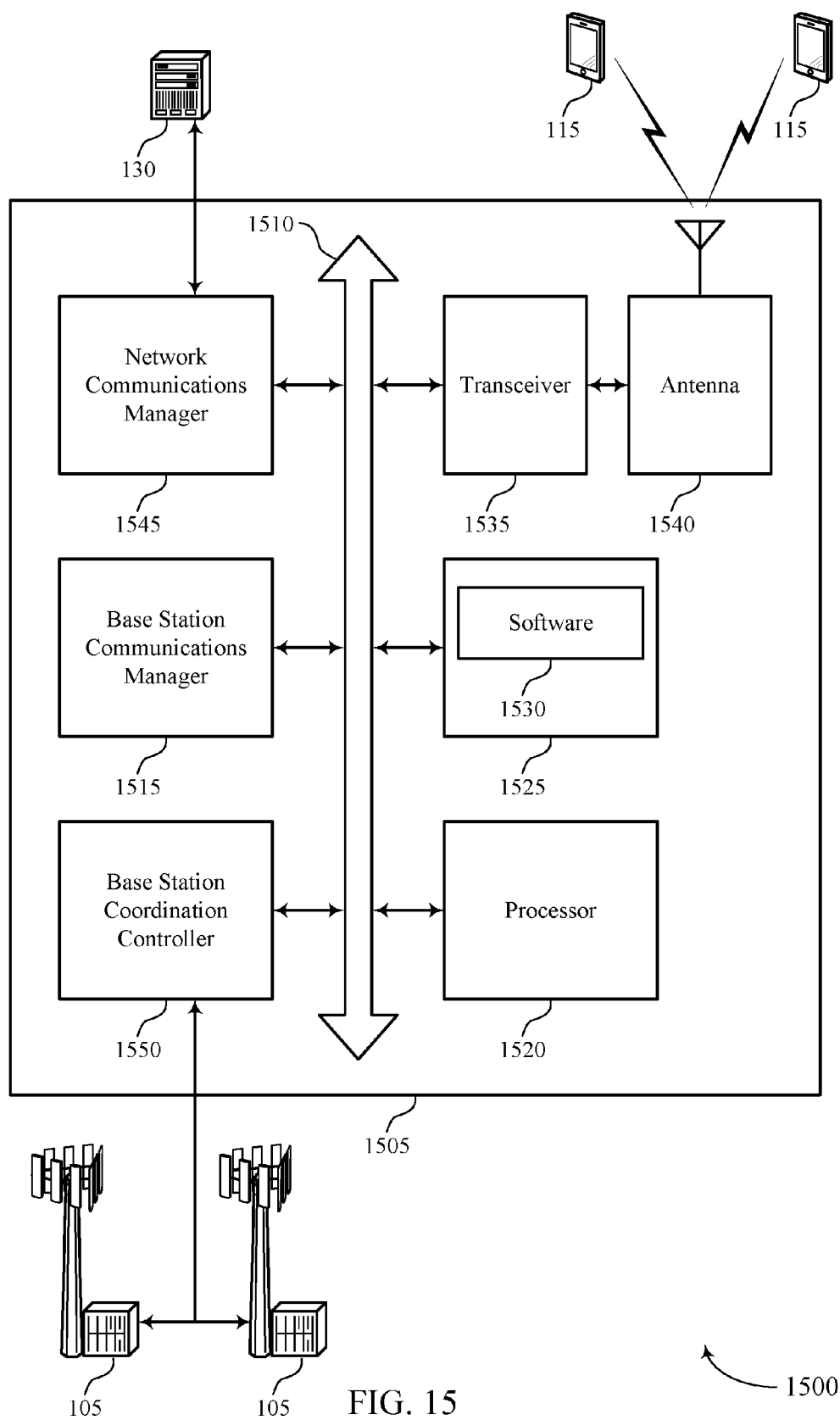
FIG. 15 illustrates a diagram of a system including a base station that supports header compression for reduced bandwidth wireless devices in accordance with aspects of the present disclosure.

FIG. 15 shows a diagram of a system 1500 including a device 1505 that supports header compression for reduced bandwidth wireless devices in accordance with various aspects of the present disclosure. Device 1505 may be an example of or include the components of base station 105 as described above, (e.g., with reference to FIG. 1). Device 1505 may include components for bi-directional multimedia and data communications including components for transmitting and receiving communications, including base station communications manager 1515, processor 1520, memory 1525, software 1530, transceiver 1535, antenna 1540, network communications manager 1545, and base station coordination manager 1550. These components may be in electronic communication via one or more busses (e.g., bus 1510). Device 1505 may communicate wirelessly with one or more UEs 115.

Base station coordination manager 1550 may manage communications with other base station 105, and may include a controller or scheduler for controlling communications with UEs 115 in cooperation with other base stations 105. For example, the base station coordination manager 1550 may coordinate scheduling for transmissions to UEs 115 for various interference mitigation techniques such as beamforming or joint transmission. In some examples, base station coordination manager 1550 may provide an X2 interface within an Long Term Evolution (LTE)/LTE-A wireless communication network technology to provide communication between base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting header compression for reduced bandwidth wireless devices).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support header compression for reduced bandwidth wireless devices. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Figure 16:
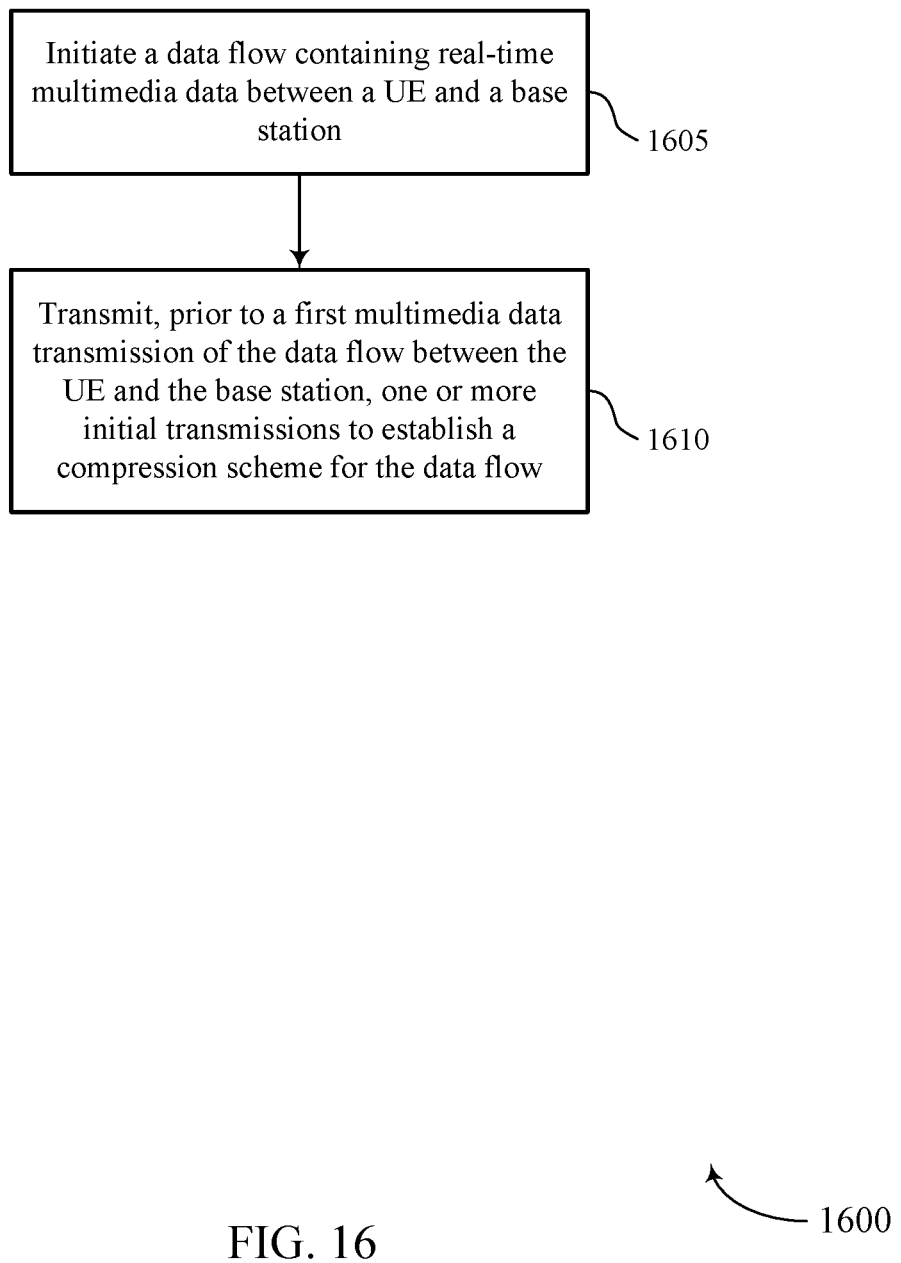
FIGS. 16 through 19 illustrate methods for header compression for reduced bandwidth wireless devices in accordance with aspects of the present disclosure.

FIG. 16 shows a flowchart illustrating a method 1600 for header compression for reduced bandwidth wireless devices in accordance with various aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may initiate a data flow, such as an IP flow, containing real-time multimedia data (e.g., voice data, video data) between a UE and a base station. The operations of block 1605 may be performed according to the methods described with reference to FIGS. 1 through 7. In certain examples, aspects of the operations of block 1605 may be performed by a data flow component as described with reference to FIGS. 8 through 11.

At block 1610 the UE 115 may transmit, prior to a first multimedia data transmission of the data flow between the UE and the base station, one or more initial transmissions to establish a compression scheme for the data flow. The operations of block 1610 may be performed according to the methods described with reference to FIGS. 1 through 7. In certain examples, aspects of the operations of block 1610 may be performed by a compression component as described with reference to FIGS. 8 through 11.

Figure 17:
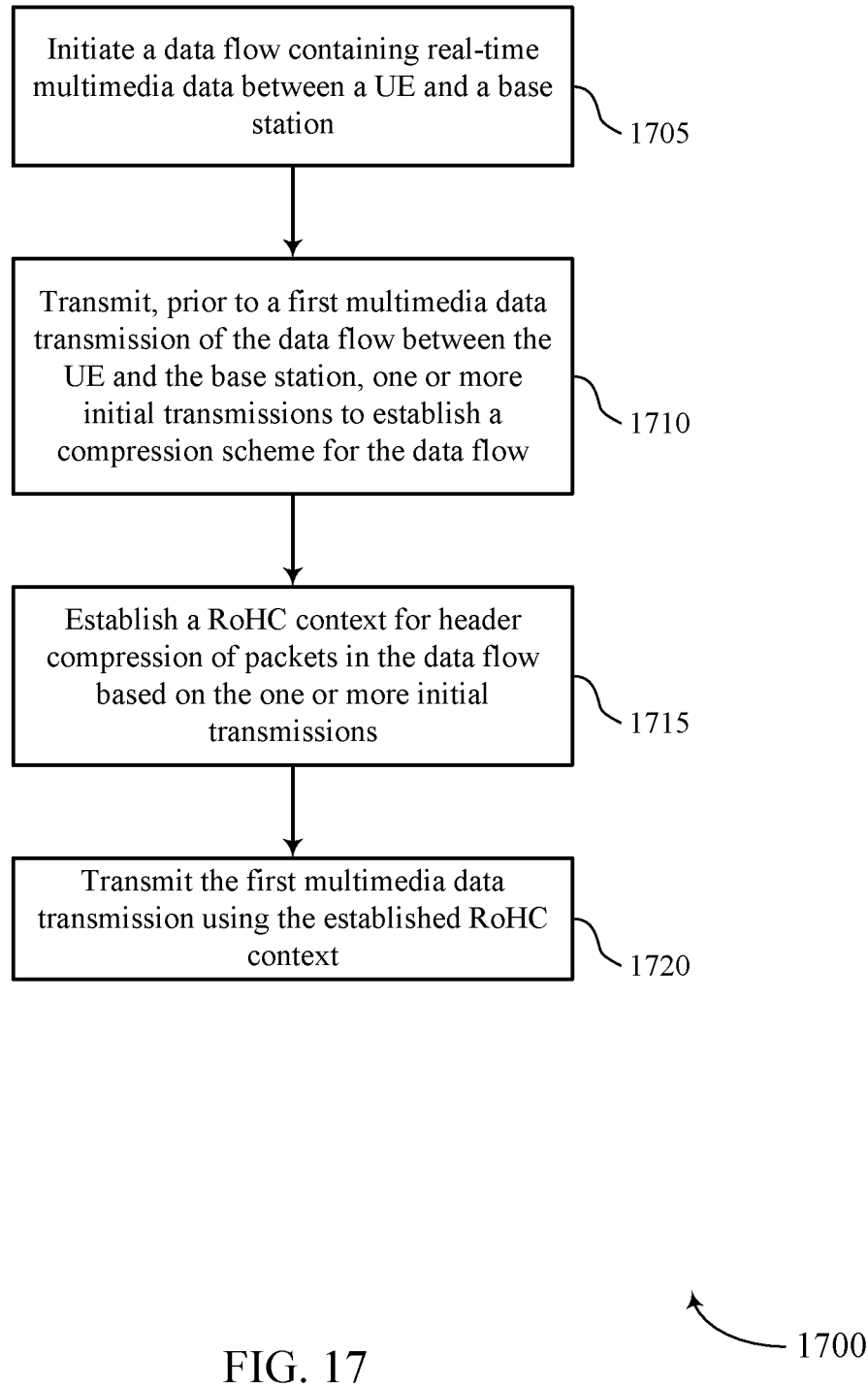

FIG. 17 shows a flowchart illustrating a method 1700 for header compression for reduced bandwidth wireless devices in accordance with various aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may initiate a data flow, such as an IP flow, containing real-time multimedia data (e.g., voice data, video data) between a UE and a base station. The operations of block 1705 may be performed according to the methods described with reference to FIGS. 1 through 7. In certain examples, aspects of the operations of block 1705 may be performed by a data flow component as described with reference to FIGS. 8 through 11.

At block 1710 the UE 115 may transmit, prior to a first multimedia data transmission of the data flow between the UE and the base station, one or more initial transmissions to establish a compression scheme for the data flow. The operations of block 1710 may be performed according to the methods described with reference to FIGS. 1 through 7. In certain examples, aspects of the operations of block 1710 may be performed by a compression component as described with reference to FIGS. 8 through 11.

At block 1715 the UE 115 may establish a RoHC context for header compression of packets in the data flow based on the one or more initial transmissions. The operations of block 1715 may be performed according to the methods described with reference to FIGS. 1 through 7. In certain examples, aspects of the operations of block 1715 may be performed by a compression component as described with reference to FIGS. 8 through 11.

At block 1720 the UE 115 may transmit the first multimedia data transmission using the established RoHC context. The operations of block 1720 may be performed according to the methods described with reference to FIGS. 1 through 7. In certain examples, aspects of the operations of block 1720 may be performed by a multimedia data transmission component as described with reference to FIGS. 8 through 11.

Figure 18:
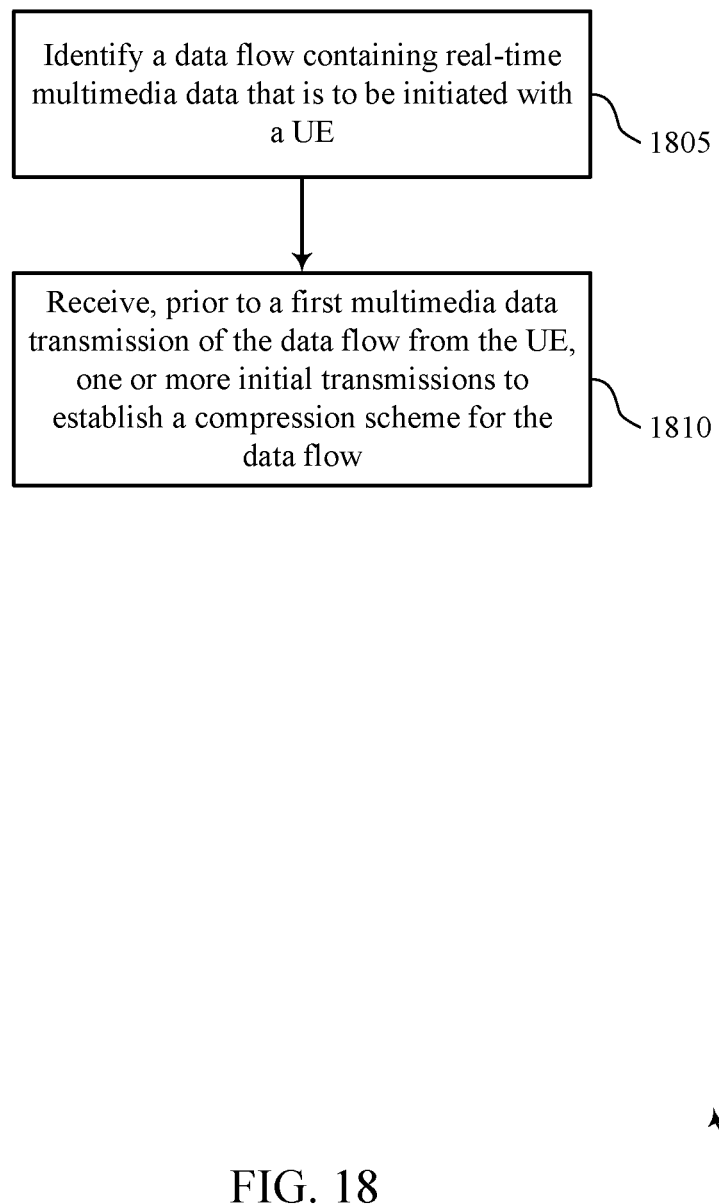

FIG. 18 shows a flowchart illustrating a method 1800 for header compression for reduced bandwidth wireless devices in accordance with various aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a data flow, such as an IP flow, containing real-time multimedia data (e.g., voice data, video data) that is to be initiated with a UE. The operations of block 1805 may be performed according to the methods described with reference to FIGS. 1 through 7. In certain examples, aspects of the operations of block 1805 may be performed by a data flow component as described with reference to FIGS. 12 through 15.

At block 1810 the base station 105 may receive, prior to a first multimedia data transmission of the data flow from the UE, one or more initial transmissions to establish a compression scheme for the data flow. The operations of block 1810 may be performed according to the methods described with reference to FIGS. 1 through 7. In certain examples, aspects of the operations of block 1810 may be performed by a compression component as described with reference to FIGS. 12 through 15. In some cases, the method is performed at a target base station that is to communicate with the UE following a handover from a source base station, and wherein the one or more initial transmissions comprise a RoHC context for header compression of packets in the data flow that is established at the source base station.

Figure 19:
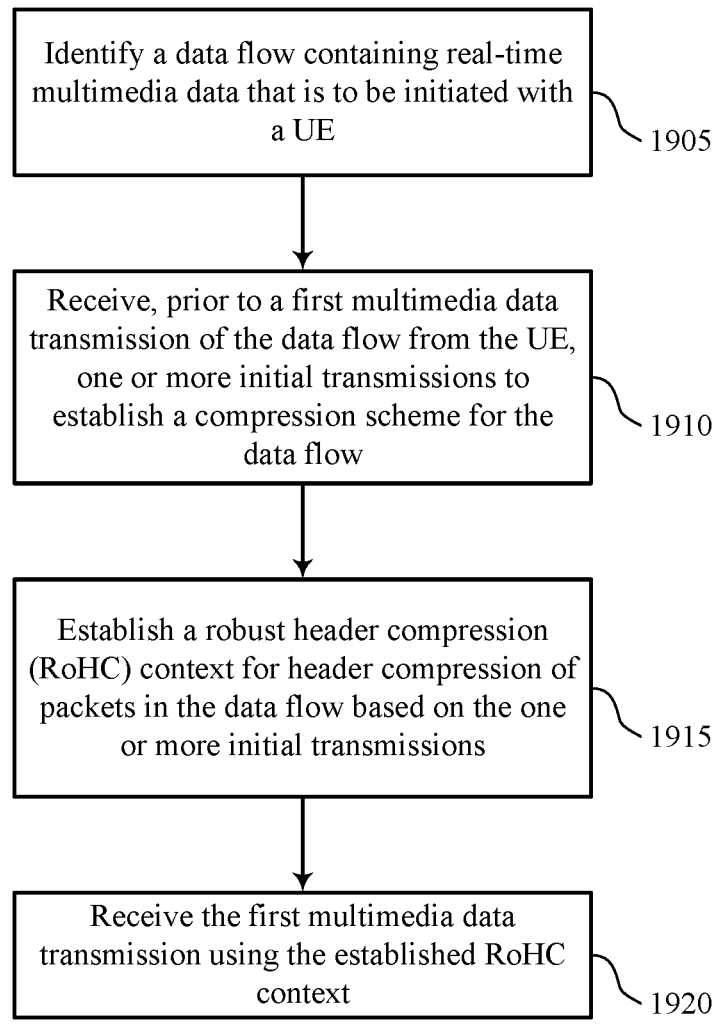

FIG. 19 shows a flowchart illustrating a method 1900 for header compression for reduced bandwidth wireless devices in accordance with various aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a data flow, such as an IP flow, containing real-time multimedia data (e.g., voice data, video data) that is to be initiated with a UE. The operations of block 1905 may be performed according to the methods described with reference to FIGS. 1 through 7. In certain examples, aspects of the operations of block 1905 may be performed by a data flow component as described with reference to FIGS. 12 through 15.

At block 1910 the base station 105 may receive, prior to a first multimedia data transmission of the data flow from the UE, one or more initial transmissions to establish a compression scheme for the data flow. The operations of block 1910 may be performed according to the methods described with reference to FIGS. 1 through 7. In certain examples, aspects of the operations of block 1910 may be performed by a compression component as described with reference to FIGS. 12 through 15.

At block 1915 the base station 105 may establish a RoHC context for header compression of packets in the data flow based at least in part on the one or more initial transmissions. The operations of block 1915 may be performed according to the methods described with reference to FIGS. 1 through 7. In certain examples, aspects of the operations of block 1915 may be performed by a compression component as described with reference to FIGS. 12 through 15.

At block 1920 the base station 105 may receive the first multimedia data transmission using the established RoHC context. The operations of block 1920 may be performed according to the methods described with reference to FIGS. 1 through 7. In certain examples, aspects of the operations of block 1920 may be performed by a compression component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   initiating a data flow containing real-time multimedia data between a user equipment (UE) and a base station;
   transmitting, prior to an initial multimedia data transmission of the data flow between the UE and the base station, one or more initial transmissions having a payload size that is smaller than an average voice packet payload size to establish a compression scheme for the data flow; and
   transmitting the initial multimedia data transmission using the compression scheme.

2. The method of claim 1, wherein the one or more initial transmissions comprises one or more silence indicator description (SID) packet transmissions.

3. The method of claim 1, wherein the one or more initial transmissions comprises one or more voice packets that include a simulated voice payload, wherein a payload size of the simulated voice payload is smaller than the average voice packet payload size.

4. The method of claim 1, wherein the one or more initial transmissions comprises one or more silence indicator description (SID) packet transmissions, or one or more voice packets that include a simulated voice payload, or one or more real-time transport protocol (RTP) extension header extension profiles, or one or more RTP voice profiles with a defined number of codec frame bits.

5. The method of claim 1, wherein the compression scheme is a robust header compression (RoHC) scheme, and wherein the method further comprises:
   establishing a RoHC context for header compression of packets in the data flow based at least in part on the one or more initial transmissions; and
   transmitting the initial multimedia data transmission using the established RoHC context.

6. The method of claim 5, wherein the established RoHC context corresponds to a first order or a second order RoHC state.

7. The method of claim 1, wherein the one or more initial transmissions comprises one or more out-of-band transmissions that establish the compression scheme for the data flow.

8. The method of claim 7, wherein the one or more out-of-band transmissions comprise one or more radio resource control (RRC) transmissions or one or more non-access stratum (NAS) messages.

9. The method of claim 7, wherein the one or more out-of-band transmissions comprises a medium access control (MAC) message that includes information to establish a robust header compression (RoHC) context for header compression of packets in the data flow.

10. The method of claim 9, wherein one or more portions of header compression information for the data flow, user datagram protocol (UDP) header fields, or real-time transport protocol (RTP) header fields including sequence number and timestamp, for the initial multimedia data transmission are determined based at least in part on the information in the MAC message.

11. The method of claim 1, further comprising:
    discontinuing the one or more initial transmissions based at least in part on the compression scheme corresponding to a first order compression state or a second order compression state, or based at least in part on an amount of buffered real-time multimedia data.

12. The method of claim 1, wherein the initiating comprises initiating a handover between a first base station and a second base station, and wherein the one or more initial transmissions comprise one or more initial transmissions between the UE and the second base station.

13. The method of claim 1, wherein the initiating comprises:
    performing a call set up with a far-end device to set up the data flow; and
    transmitting, as part of the call set up, an indication to the far-end device to establish the compression scheme prior to the initial multimedia data transmission of the data flow.

14. The method of claim 13, wherein the indication prompts the far-end device to transmit the one or more initial transmissions to establish a robust header compression (RoHC) context for header compression of packets in the data flow.

15. The method of claim 1, wherein the data flow is an internet protocol (IP) flow.

16. A method for wireless communication, comprising:
    identifying a data flow containing real-time multimedia data that is to be initiated with a user equipment (UE);
    receiving, prior to an initial multimedia data transmission of the data flow from the UE, one or more initial transmissions having a payload size that is smaller than an average voice packet payload size to establish a compression scheme for the data flow; and
    receiving the initial multimedia data transmission using the compression scheme.

17. The method of claim 16, further comprising:
    identifying the one or more initial transmissions as compression scheme establishment transmissions; and
    dropping the one or more initial transmissions from the data flow.

18. The method of claim 16, wherein the one or more initial transmissions comprises one or more silence indicator description (SID) packet transmissions, or one or more voice packets that include a simulated voice payload, or one or more real-time transport protocol (RTP) extension header extension profiles, or one or more RTP voice profiles with a defined number of codec frame bits.

19. The method of claim 16, further comprising:
    establishing a robust header compression (RoHC) context for header compression of packets in the data flow based at least in part on the one or more initial transmissions; and
    receiving the initial multimedia data transmission using the established RoHC context.

20. The method of claim 16, wherein the one or more initial transmissions comprises one or more out-of-band transmissions that establish the compression scheme for the data flow.

21. The method of claim 20, wherein the one or more out-of-band transmissions comprise one or more radio resource control (RRC) transmissions or one or more non-access stratum (NAS) messages.

22. The method of claim 16, wherein the one or more initial transmissions are discontinued when the compression scheme corresponds to a first order state or a second order state, or based at least in part on an amount of buffered real-time multimedia data.

23. The method of claim 16, wherein the method is performed at a target base station that is to communicate with the UE following a handover from a source base station, and wherein the one or more initial transmissions comprise a robust header compression (RoHC) context for header compression of packets in the data flow that is established at the source base station.

24. An apparatus for wireless communication, in a system comprising:
   a processor;
   memory in electronic communication with the processor; and
   instructions stored in the memory, the instructions being executable by the processor to:
      initiate a data flow containing real-time multimedia data between a user equipment (UE) and a base station;
      transmit, prior to an initial multimedia data transmission of the data flow between the UE and the base station, one or more initial transmissions having a payload size that is smaller than an average voice packet payload size to establish a compression scheme for the data flow; and
      transmit the initial multimedia data transmission using the compression scheme.

25. The apparatus of claim 24, wherein the one or more initial transmissions comprises one or more silence indicator description (SID) packet transmissions.

26. The apparatus of claim 24, wherein the one or more initial transmissions comprises one or more silence indicator description (SID) packet transmissions, or one or more voice packets that include a simulated voice payload, or one or more real-time transport protocol (RTP) extension header extension profiles, or one or more RTP voice profiles with a defined number of codec frame bits.

27. The apparatus of claim 24, wherein the compression scheme is a robust header compression (RoHC) scheme, and wherein the instruction are further executable to:
   establish a RoHC context for header compression of packets in the data flow based at least in part on the one or more initial transmissions; and
   transmit the initial multimedia data transmission using the established RoHC context.

28. An apparatus for wireless communication, in a system comprising:
   a processor;
   memory in electronic communication with the processor; and
   instructions stored in the memory, the instructions being executable by the processor to:
      identify a data flow containing real-time multimedia data that is to be initiated with a user equipment (UE);
      receive, prior to an initial multimedia data transmission of the data flow from the UE, one or more initial transmissions having a payload size that is smaller than an average voice packet payload size to establish a compression scheme for the data flow; and
      receive the initial multimedia data transmission using the compression scheme.

29. The apparatus of claim 28, comprising instructions further executable to:
   identify the one or more initial transmissions as compression scheme establishment transmissions; and
   drop the one or more initial transmissions from the data flow.

30. The apparatus of claim 28, comprising instructions further executable to:
   establish a robust header compression (RoHC) context for header compression of packets in the data flow based at least in part on the one or more initial transmissions; and
   receive the initial multimedia data transmission using the established RoHC context.

* * * * *